(12) United States Patent
Lehmann et al.

(10) Patent No.: US 12,393,610 B2
(45) Date of Patent: Aug. 19, 2025

(54) COGNITION MANAGEMENT SYSTEM AND METHODS FOR MANAGING RESEARCH AND DEVELOPMENT ACTIVITY

(71) Applicant: Portal Innovations, LLC, Chicago, IL (US)

(72) Inventors: Steven Scott Lehmann, Chicago, IL (US); Eamon Kenneth Duede, Chicago, IL (US); Jeremy Lawrence Langsam, Chicago, IL (US)

(73) Assignee: Portal Innovations, LLC, Chicago, IL (US)

( * ) Notice: Subject to any disclaimer, the term of this patent is extended or adjusted under 35 U.S.C. 154(b) by 0 days.

(21) Appl. No.: 18/654,462

(22) Filed: May 3, 2024

(65) Prior Publication Data

US 2024/0370464 A1 Nov. 7, 2024

Related U.S. Application Data

(60) Provisional application No. 63/559,025, filed on Feb. 28, 2024, provisional application No. 63/463,707, filed on May 3, 2023.

(51) Int. Cl.
| | |
|---|---|
| G06F 16/28 | (2019.01) |
| G06F 16/22 | (2019.01) |
| G06F 16/25 | (2019.01) |
| G06F 16/31 | (2019.01) |
| G06F 16/334 | (2025.01) |

(Continued)

(52) U.S. Cl.
CPC ........ *G06F 16/285* (2019.01); *G06F 16/2264* (2019.01); *G06F 16/258* (2019.01); *G06F 16/316* (2019.01); *G06F 16/3347* (2019.01); *G06F 16/35* (2019.01); *G06N 20/00* (2019.01)

(58) Field of Classification Search
CPC .. G06F 16/285; G06F 16/316; G06F 16/3347; G06F 16/35; G06F 16/258; G06F 16/2264; G06F 16/248; G06F 3/04842; G06F 3/04847; G06F 16/355; G06F 16/906; G06F 16/93; G06F 16/358; G06F 16/45; G06F 18/24147; G06F 18/2411;

(Continued)

(56) References Cited

U.S. PATENT DOCUMENTS 5,873,056 A * 2/1999 Liddy .................. G06F 16/313
707/E17.084
9,787,705 B1 * 10/2017 Love .................. G06F 16/9024

(Continued)

*Primary Examiner* — Evan Aspinwall
(74) *Attorney, Agent, or Firm* — Polsinelli PC

(57) ABSTRACT

Disclosed are systems, apparatuses, methods, and computer readable medium for managing research activity and development across scientific, technical, medical, and other knowledge domains. A method includes: identifying nodes from content from different data sources, wherein the content includes grant information, a technical publication, or a legal publication and each node corresponds to an entity associated with technical data; associating at least one content item from the different data sources to a corresponding node; normalizing vectors identifying features of each content item based on linguistic differences associated with the different data sources; generating embeddings associated with each content item based on normalized vectors associated with each content item; and identifying a first node based on content items associated with the first node.

17 Claims, 19 Drawing Sheets

(51) Int. Cl.
*G06F 16/35* (2025.01)
*G06N 20/00* (2019.01)

(58) Field of Classification Search
CPC ...... G06F 18/2137; G06N 20/00; G06N 5/02; G06N 5/022
USPC .......................................................... 707/737
See application file for complete search history.

(56) References Cited

U.S. PATENT DOCUMENTS

| | | | |
|---|---|---|---|
| 12,061,612 B1* | 8/2024 | Sager | G06F 16/24573 |
| 2004/0107221 A1* | 6/2004 | Trepess | G06F 18/2137 |
| 2006/0206512 A1* | 9/2006 | Hanrahan | G06T 11/206 |
| | | | 707/999.102 |
| 2008/0021896 A1* | 1/2008 | Turski | G06F 16/285 |
| | | | 707/999.005 |
| 2012/0041955 A1* | 2/2012 | Regev | G06F 16/355 |
| | | | 707/E17.089 |
| 2012/0284275 A1* | 11/2012 | Vadrevu | G06F 16/9538 |
| | | | 707/738 |
| 2016/0117589 A1* | 4/2016 | Scholtes | G06N 5/02 |
| | | | 706/12 |
| 2016/0239487 A1* | 8/2016 | Potharaju | G06F 16/24578 |
| 2018/0089556 A1* | 3/2018 | Zeiler | G06N 3/08 |
| 2018/0144269 A1* | 5/2018 | Wilson | G06N 5/022 |
| 2018/0196873 A1* | 7/2018 | Yerebakan | G06N 3/08 |
| 2018/0253650 A9* | 9/2018 | Liang | G06N 5/02 |
| 2018/0329990 A1* | 11/2018 | Severn | G06F 16/335 |
| 2019/0258627 A1* | 8/2019 | Rosenthal | |
| 2019/0289366 A1* | 9/2019 | Srinivasaraghavan | |
| 2019/0354883 A1* | 11/2019 | Aravamudan | G06F 40/30 |
| 2020/0349199 A1* | 11/2020 | Jayaraman | G06F 40/49 |
| 2021/0005316 A1* | 1/2021 | Neumann | G06N 3/08 |
| 2021/0073251 A1* | 3/2021 | Eckardt | |
| 2021/0357378 A1* | 11/2021 | Urdiales | G06N 3/08 |
| 2022/0092443 A1* | 3/2022 | Seyot | G06F 40/295 |
| 2022/0138258 A1* | 5/2022 | Misiewicz | G06F 16/355 |
| | | | 707/737 |
| 2022/0171794 A1* | 6/2022 | Kumaresan | G06F 16/355 |
| 2022/0374735 A1* | 11/2022 | Rathod | G06F 16/9024 |
| 2023/0004592 A1* | 1/2023 | Mostafa | G06F 16/3334 |
| 2023/0253122 A1* | 8/2023 | Neumann | G16H 50/50 |
| | | | 705/2 |
| 2023/0259539 A1* | 8/2023 | Course | G06F 16/3347 |
| | | | 707/758 |
| 2023/0297624 A1* | 9/2023 | Asano | G06F 16/3347 |
| | | | 707/722 |
| 2023/0409614 A1* | 12/2023 | Hamilton | G06F 16/9024 |
| 2024/0152561 A1* | 5/2024 | Mallapragada | G06F 16/9038 |

\* cited by examiner

| Innovation Cluster | Classifications | Publications | Grants | Patents | Startups | Publications / 100K Grant $s | Patents / 1M Grant $s | Startups /10M Grant $s |
|---|---|---|---|---|---|---|---|---|
| Lipid Nanoparticles | LNP, Nucleic Acids | | | | | 5.2 | 2.2 | 0.9 |
| Extracellular Vesicles | EV, Membrane | | | | | 3.2 | 2.2 | 5.0 |
| Polymer Nanoparticles | Polymeric Micelle, Linker | | | | | 2.0 | 3.2 | 2.2 |
| Adeno-associated Viruses | AAV5, Dependovirus | | | | | 7.1 | 4.8 | 3.2 |
| Other Viruses | Lentivirus | | | | | 4.2 | 6.8 | 0.5 |

FIG. 7

COGNITION MANAGEMENT SYSTEM AND METHODS FOR MANAGING RESEARCH AND DEVELOPMENT ACTIVITY

CROSS-REFERENCE TO RELATED APPLICATIONS

This application claims priority to U.S. Provisional Patent Application No. 63/463,707, filed May 3, 2023, and U.S. Provisional Patent Application No. 63/559,025, filed Feb. 28, 2024, which are hereby incorporated by reference, in their entirety and for all purposes.

TECHNICAL FIELD

The present disclosure generally relates to cognition management systems. In some examples, aspects of the present disclosure are related to a cognition management system for managing research activity and development across scientific, technical, medical, and other knowledge domains.

BACKGROUND

The volume of academic and scientific research has been steadily increasing in recent years and the number of research articles published globally has nearly doubled from 1.3 million in 2000 to over 2.5 million in 2016. This growth is driven by factors such as increased funding for research, technological advancements in research tools and methods, and the globalization of research collaboration. The growth is also driven by the increasing demand for evidence-based solutions to complex problems in various fields such as health, environment, and technology.

Despite the increasing volume of research, concerns have been raised about the quality, reproducibility, and credibility of research findings. There have been reports of scientific misconduct, publication bias, and flawed research designs that have led to retractions of research articles. This has led to a growing emphasis on transparency, openness, and accountability in the research process. Initiatives such as open-access publishing, data sharing, and pre-registration of research designs have been promoted to improve the rigor and reliability of scientific research. As such, it is difficult to gauge and comprehend the volume of academic and scientific research accurately using manual and conventional analysis.

SUMMARY

In some examples, systems, and techniques are described for managing research activity and development across scientific, technical, medical, and other knowledge domains. The systems and techniques can provide visibility into research and development activities across different knowledge domains.

Disclosed are systems, apparatuses, methods, computer readable medium, and circuits for surfacing research and development metadata. According to at least one example, a method is provided and includes: identifying nodes from content from different data sources, wherein the content includes grant information, a technical publication, or a legal publication and each node corresponds to an entity associated with technical data; associating at least one content item from the different data sources to a corresponding apparatus for surfacing research and development metadata node; normalizing vectors identifying features of each content item based on linguistic differences associated with the different data sources; generating embeddings associated with each content item based on normalized vectors associated with each content item; and identifying a first node based on content items associated with the first node.

In another example, an is provided that includes a storage (e.g., a memory configured to store data, such as virtual content data, one or more images, etc.) and at least one processor (e.g., implemented in circuitry) coupled to the memory and configured to execute instructions and, in conjunction with various components (e.g., a network interface, a display, an output device, etc.), cause the apparatus to: identify nodes from content from different data sources, wherein the content includes grant information, a technical publication, or a legal publication and each node corresponds to an entity associated with technical data; associate at least one content item from the different data sources to a corresponding node; normalize vectors identifying features of each content item based on linguistic differences associated with the different data sources; generate embeddings associated with each content item based on normalized vectors associated with each content item; and identify a first node based on content items associated with the first node.

Disclosed are systems, apparatuses, methods, computer readable medium, and circuits for surfacing research and development metadata. According to at least one example, a method is provided and includes: identifying nodes from content from different data sources, wherein the content includes grant information, a technical publication, or a legal publication and each node corresponds to an entity associated with technical data; associating at least one content item from the different data sources to a corresponding node; normalizing vectors identifying features of each content item based on linguistic differences associated with the different data sources; generating embeddings associated with each content item based on normalized vectors associated with each content item; and identifying a first node based on content items associated with the first node.

In another example, an apparatus for surfacing research and development metadata is provided that includes a storage (e.g., a memory configured to store data, such as virtual content data, one or more images, etc.) and at least one processor (e.g., implemented in circuitry) coupled to the memory and configured to execute instructions and, in conjunction with various components (e.g., a network interface, a display, an output device, etc.), cause the apparatus to: identify nodes from content from different data sources, wherein the content includes grant information, a technical publication, or a legal publication and each node corresponds to an entity associated with technical data; associate at least one content item from the different data sources to a corresponding node; normalize vectors identifying features of each content item based on linguistic differences associated with the different data sources; generate embeddings associated with each content item based on normalized vectors associated with each content item; and identify a first node based on content items associated with the first node This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

In order to describe the manner in which the various advantages and features of the disclosure can be obtained, a more particular description of the principles described herein will be rendered by reference to specific embodiments thereof which are illustrated in the appended drawings. Understanding that these drawings depict only example embodiments of the disclosure and are not to be considered to limit its scope, the principles herein are described and explained with additional specificity and detail through the use of the drawings in which:

FIG. 7 is an example visualization 700 related to innovation clusters over time that can be provided by a cognition management system in accordance with some aspects of the disclosure;

DETAILED DESCRIPTION

Figure 1:
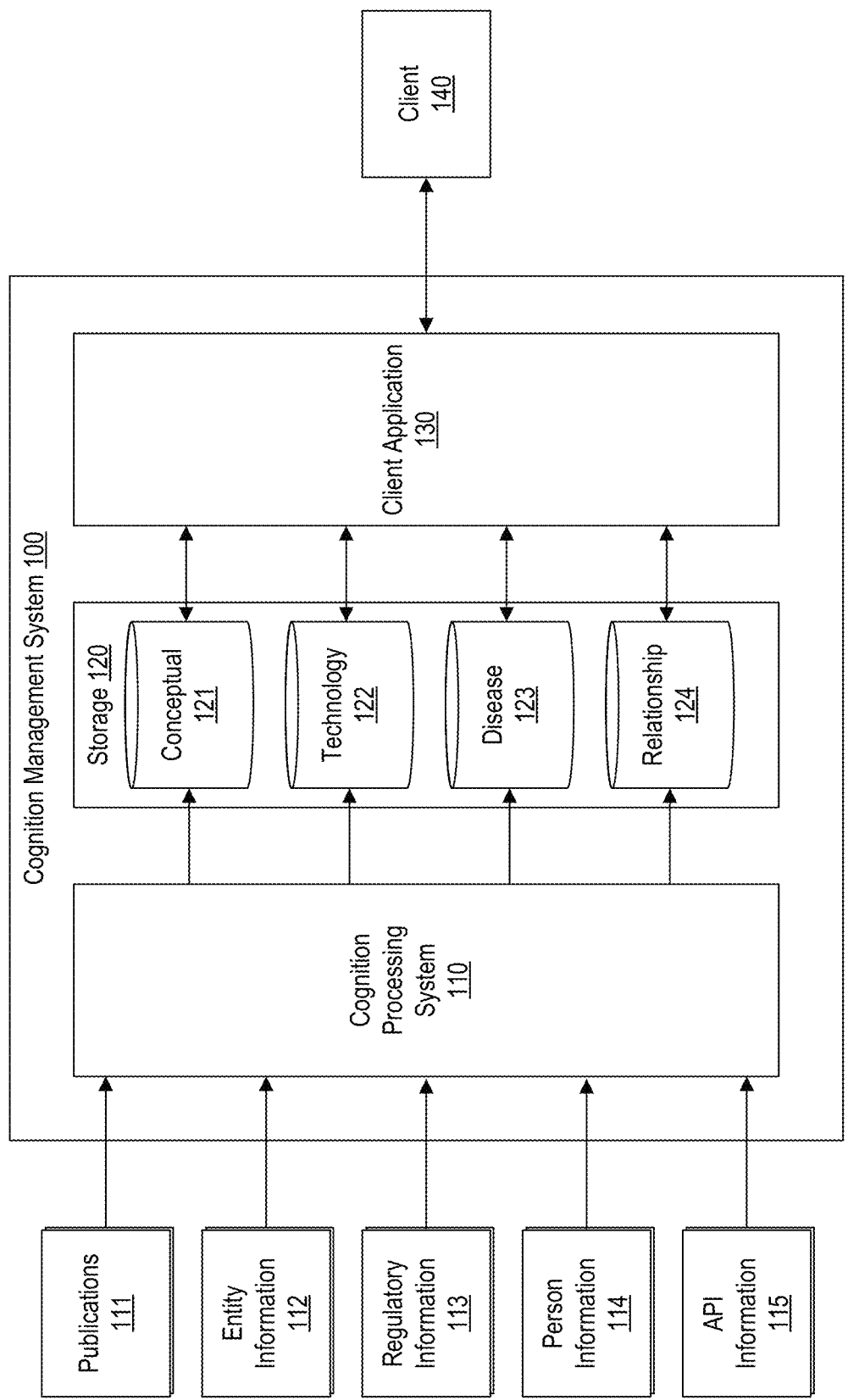
FIG. 1 is a block diagram illustrating an example cognition management system in accordance with some aspects of the disclosure.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and descriptions are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

The terms "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

As previously described, the volume of research and scientific information that is available is increased. Identification and application of the knowledge or cognition of the research is increasingly difficult based on the volume of information, the different sources of information, and the accuracy of the information. In some cases, important information related to scientific and research information, as well as financial and business information pertaining to the scientific and research information is difficult to obtain in a timely manner. There have been many instances of earlier research identifying solutions pertaining to similar fields that have resulted in later adoption because there is no technique for providing an intuitive understanding of different cognition spaces that can yield pertinent information.

Disclosed herein are systems, methods, and computer-readable storage media for managing cognition to identify pertinent scientific, business, and research information. In some aspects, the approaches herein can use unstructured information and transform the unstructured information into various domains of cognition. The domains of cognition identify different types of information and are used to determine direct information or indirect information.

The cognition management system can include a machine learning (ML) model or other artificial intelligence (AI) network that is capable of understanding unstructured data to build domains of cognition knowledge and identify transformations within the domains of cognition knowledge. The transformations can pertain to knowledge areas, people, entities, and other categories to identify pertinent information and trends and allow cognition contained within the cognition management system to be presented to a user in various forms. For example, the cognition management system can identify entities, people, and papers that are pertinent to different types of input, predict trends relevant to different domains of knowledge, and identify opportunities for investment, research, or interest. In some aspects, the cognition management system can map different types of participants (e.g., faculty, startups, investors, etc.) to geographical regions, identify key participants and trends driving any field or technology, and uncover the patterns linking inputs (funding, people, infrastructure) and outputs (inventions, startups). The cognition management system can also predict innovation phenotypes from research genotypes and identify disruptive research, disruptive participants, and future trends in one or more knowledge domains.

Based on the various domains of knowledge, users can identify relevant knowledge, trends, entities, people, and other information that would otherwise be inaccessible based on the volume of information extracted and processed by the cognition management system. In some aspects, the cognition management system provides generalized information to specific information in visualizations and other outputs such as lists that are responsive to a user's query.

Additional details and aspects of the present disclosure are described in more detail below with respect to the figures.

FIG. 1 is a block diagram illustrating a cognition management system 100, in accordance with some aspects of the disclosure. In some aspects, the cognition management system 100 includes a cognition processing system 110, a storage system 120, and a client application 130.

According to various aspects, the cognition processing system 110 is configured to receive unstructured content and process the unstructured input into different domains of knowledge. The processing of the unstructured input is a transformation that changes the use of the data into embeddings that represent a feature. Unstructured content is any content with text that lacks a predefined format or organization and may include a variety of information, such as sentences, paragraphs, bullet points, headings, images, tables, and hyperlinks, arranged in a non-linear or free-form way. Unstructured content can be found in various contexts, such as emails, papers, grants, social media posts, web pages, legal contracts, research papers, or customer reviews. Unstructured content can also be semi-structured content, such as extensible markup language (XML) without a formal schema that identifies relationships, or JavaScript object notation (JSON) that identifies hierarchical information in text format. Non-limiting examples of unstructured content input into the cognition management system 100 include publications 111 (e.g., scientific publications, patents, patent publications, journal articles, presentations, etc.), entity information 112 (e.g., a biography of a business or other legal entity, etc.), regulatory information 113 (e.g., clinical trial information, Food and Drug Administration (FDA) filings, SEC filings, etc.), person information 114 (e.g., biography of individuals), an application programming interface (API) information 115 (e.g., information extracted from an API, information pertaining to the API, etc.)

The cognition processing system 110 is configured to receive the unstructured content and convert pertinent information into various domains of knowledge using one or more ML-based techniques. In one illustrative aspect, the cognition processing system 110 implements a transformer to generate embedding associated with content within the unstructured content. For example, the cognition processing system 110 identifies various groups of embedding and separates information into the different groups that are stored in the storage system 120. Non-limiting examples of groups include conceptual content 121, technology content 122, disease content 123, and relationship content 124.

The storage system 120 can be implemented using various mechanisms such as a combination of file storage, object storage, and/or block storage. In some cases, the various embeddings (e.g., the conceptual content 121, the technology content 122, the disease content 123, and the relationship content 124) can be made available using various distributed storage means, such as a sharded document database and provide information that is responsive to various requests from the client application 130. In one illustrative aspect, the client application 130 includes one or more applications that are executed at a server (e.g., the cognition management system 100), a client 140, or a client and a server to query the storage system 120 and form a response to the query. The client application 130 is configured to output the response alone, in combination with other pertinent information (e.g., a map), across time, or in various configurations to enable a user to understand a knowledge area and forecast future areas of interest. For example, the storage system 120 can identify responses to technology fields that are heavily cross-pollinating or identify emerging innovations or subfields. In another example, the storage system 120 can identify fields in which grant dollars are converted into intellectual property at the highest rate, and can compare to venture capital dollars, in different regions, and over time. In another example, the storage system 120 can identify movement within the protein degradation field in relation to other technologies at different times.

Figure 2:
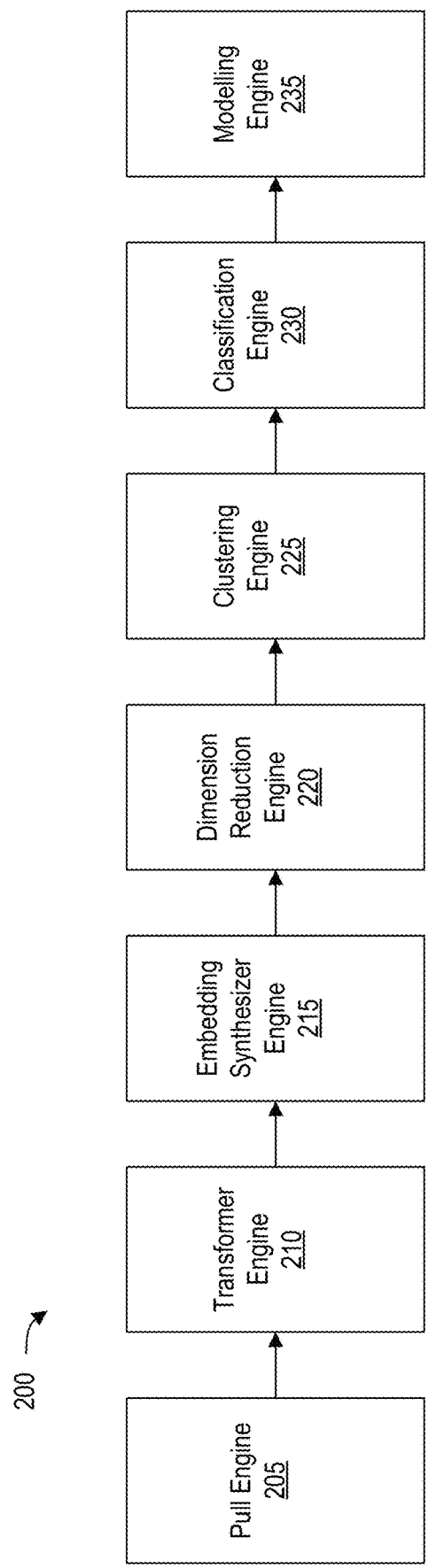
FIG. 2 is a block diagram illustrating an example of a cognition processing system 200 of a cognition management system for processing content in accordance with some aspects of the disclosure.

FIG. 2 is a block diagram illustrating an example of a cognition processing system 200 of a cognition management system for processing content from different data sources, in accordance with some aspects of the disclosure. In some aspects, the content may be structured or semi-structured as noted above to enable unsupervised operation of the cognition processing system 200.

In some aspects, the cognition processing system 200 includes a pull engine 205 that is configured to pull structured, semi-structured, and unstructured content from various data sources. For example, the pull engine 205 can include a combination of supervised or unsupervised systems for extracting technical data. Non-limiting examples of technical data include grant information (e.g., from the National Institute of Health (NIH)) related to grants to individuals or other entities, patents or patent publications, clinical trial data from other regulatory agencies, technical publications, and so forth. For example, the pull engine can use a supervised API engine to make calls into an API to extract data. In other cases, the pull engine 205 can also scrape using conventional content scraping or can use a headless scraper (e.g. Puppeteer) to handle modern web application structures. As an example, the supervised API engine can selectively send requests to PubMed, a database for biomedical literature, to identify literature to extract.

A transformer engine 210 is configured to receive the content, normalize the content based on the source, and process the content into one or more embeddings. In some aspects, the transformer engine 210 may preprocess the different sources of content based on specific linguistic features associated with the source. For example, patent applications and corresponding literature use more generic language to describe specific scientific concepts, and technical publications uses more specific scientific language. Further still, the transformer engine 210 can also identify and associate different sections of content. For example, patents and technical papers have similar sections (e.g., background, summary, abstract) that have different names. The transformer engine 210 is configured to normalize the different sections of content.

In some aspects, the transformer engine 210 may also include a transformer, which is a neural network architecture used in natural language processing (NLP) tasks, such as language translation, sentiment analysis, and text summarization. Conventional traditional recurrent neural networks (RNNs) process data in sequence, which slows the operations and training. A transformer or transformer network can process input text in parallel and is faster and more efficient than sequential training and processing. In some aspects, transformers use a self-attention mechanism, which allows a transformer to identify the most relevant parts of the input text or content (e.g., audio or video). In some cases, transformers can also use a cross-attention mechanism which uses other content or data to determine the most relevant parts of the input. For example, cross-attention mechanisms are useful in sequential content such as a stream of data.

A transformer model includes a multi-layer encoder-decoder architecture. The encoder takes the input text and converts the input text into a sequence of hidden representations and captures the meaning of the text at different levels of abstraction. The decoder then uses these representations to generate an output sequence, such as a text translation or a summary. The encoder and decoder are trained together using a combination of supervised and unsupervised learning techniques, such as maximum likelihood estimation and self-supervised pretraining. Illustrative examples of transformer engines include a Bidirectional Encoder Representations from Transformers (BERT) model, a Text-to-Text Transfer Transformer (T5), biomedical BERT (BioBERT), scientific BERT (SciBERT), and the SPECTER model for document-level representation learning. In some aspects, multiple transformer engines may be used to generate different embeddings.

An embedding is a representation of a discrete object, such as a word, a document, or an image, as a continuous vector in a multi-dimensional space. An embedding captures the semantic or structural relationships between the objects, such that similar objects are mapped to nearby vectors, and dissimilar objects are mapped to distant vectors. Embeddings are commonly used in machine learning and natural language processing tasks, such as language modeling, sentiment analysis, and machine translation. Embeddings are typically learned from large corpora of data using unsupervised learning algorithms, such as word2vec, GloVe, or fastText, which optimize the embeddings based on the co-occurrence or context of the objects in the data. Once learned, embeddings can be used to improve the performance of downstream tasks by providing a more meaningful and compact representation of the objects.

According to some aspects, a date associated with the document can also be extracted by using the transformer engine 210 or a logic-based approach. For example, the cognition processing system 200 can identify a date related within a universal resource indicator (URI), content with a URI to the content, and so forth.

In one aspect, the transformer engine 210 is configured to alter linguistic features of the content. For example, the transformer engine 210 may be configured to normalize vectors identifying features of each content item based on linguistic differences associated with the different data sources. For example, patent-related documents use generic words to describe content more broadly than finer, specific technical documents. Grants may use more common language mixed with terminology used within the field. Technical publications may be terminology heavy and may feature common terms that have a specific meaning. Terminology in many cases is fluid, with each specific technical specialty having its own terminology, and a more general overlapping terminology that is applied to the higher-level abstractions. A higher-level abstraction for example is medicine, and a lower-level abstraction within medicine would be immunotherapy.

The transformer engine 210 is configured to apply different transformations to each content item based on the source. In one aspect, the transformer engine 210 is configured to extract a representative list of words (e.g., a bag of words) or word stems (e.g., a root form of the word generated based on lemmatization) from each feature within the content item. A feature may also be referred to as a metaknowledge artifact and represents a technical concept or an entity associated with that concept (e.g., descriptions of research papers, patents, grants, clinical trials, startups, drugs, inventors, entities). By mapping the features of different types of documents into a common vector space, the transformer engine 210 can normalize different content having different linguistic features into a common grammatical/syntactical space.

In one example, the transformer engine 210 may use a list of words or word stems and reduce the content based on the list of words or word stems. For example, the words that are not within the list or associated with a word stem may be removed. This will reduce many common grammatical features, and feeding this content into a transformer can yield the most important technical concepts.

In another example, the transformer engine 210 may use a list of words or word stems and amplify the words in the list of words. For example, a different version of a particular word can be generated from a word and that word can be spread through the text content. For example, a gerund verb can be converted into an adjectival modifier, and the adjectival modifier can be positioned in front of other objects after the gerund verb. Another technique can be to duplicate this word or a phrase associated with the word. A transformer will give a higher attention value to these words and increase the grammatical value. In another variation of this example, the identified words in the list of words or word stems can be used to generate new content at the terminal ends of the original content. For example, a paragraph of 5 sentences can be supplemented with an additional leading sentence (e.g., the first sentence) and an additional trailing sentence based on the list of words. The first and last sentence of any paragraph has higher syntactical value, and adding new sentences can increase the attention of these words.

In another example, the transformer engine 210 can include the generation of a prompt into a large language model (LLM) and obtain normalized content based on the prompt. For example, a prompt can be generated at identifies the content and requests the LLM to transform the text content using the list of words or word stems. In some cases, the LLM can be trained based on particular knowledge sets, and different LLMs may be used according to a generalized category of the technical field. In some cases, the prompt includes hints or suggestions relating to at least one embedding or classification. For example, a named entity recognizer may be configured to provide hints.

The transformer engine 210 normalizes the text of content items from different data sources into a common text space having similar linguistic features, which can improve the generation of embeddings associated with the different content. For example, the transformer network in the transformer engine 210 can then process the text and may be configured to generate embeddings associated with the content using the attention values.

The transformer engine is configured to identify an equivalent portion of the content from the different data sources (e.g., the vectors are identified from the equivalent portion of the content) and transform the equivalent portion of the content from the different data sources into normalized content. The transformer network of the transformer engine 210 may generate embeddings associated with each content item based on normalized vectors associated with each content item. However, the embeddings may need additional processing to further reduce the dimensionality and to further normalize and clean data for training. The additional processing can also improve inference performance.

After the transformer engine, 210 transforms the various inputs into embeddings that represent different concepts within the document, an embedding synthesizer engine 215 is configured to calculate synthetic embeddings of one or more entities associated with the document based on the average vector of their documents. In some aspects, the entity can be one or more authors (e.g., researchers) of a scientific paper or one or more inventors of a patent application (or patent). The entity can also be a business entity or educational entity that publishes and provides scientific content on a public resource (e.g., standards committee publications, regulatory submissions, etc.). For example, a business entity can provide a white paper related to research that is available on a public website available from a domain of that business entity.

In some aspects, the embedding synthesizer engine 215 can generate a representative embedding associated with the entity based on a combination of embeddings associated with that entity. In one aspect, representative embeddings of a researcher can be computed based on averaging the embeddings of each content (e.g., research paper, patent application) that is associated. For example, the embedding synthesizer engine 215 may identify ten different journal articles that a researcher contributed to and may generate a representative embedding associated with the researcher by averaging the embeddings from each journal article. The representative embedding may be generated by other techniques, such as weighting each article or weighting portions of an article based on various factors.

In other aspects, the representative embedding can be generated for other entities based on identifying a correlation from content to the entity. For example, a correlation to a university can be identified based on the researcher's employment with the university. Correlations can also be identified based on other documents, such as regulatory filings, investor materials, and so forth.

The embeddings are provided to a dimension reduction engine 220 to obtain a set of principal variables and use ML or statistics to reduce the quantity of random variables within the embeddings. The dimension reduction engine 220 includes a feature selection component to select subsets of features that are chosen from the embeddings based on filtering, wrapping, or further embedding. The dimension reduction engine 220 also includes a feature extraction component that reduces the number of dimensions to model the variables and perform component analysis. Non-limiting examples of a dimension reduction engine 220 include factor analysis, a low variance filter, a high correlation filter, principle component analysis (PCA), uniform manifold approximation and projection (UMAP), independent component analysis, missing value ratio, and random forest. In some aspects, dimensionality reduction compresses the data to consume less space, reduces computation time, and aids with data visualization techniques.

After dimension reduction, the embeddings are provided to a clustering engine 225 to group similar concepts. The clustering engine 225 is configured to cluster unlabeled embeddings based on multi-dimensional proximity to ensure that related concepts are grouped. In one aspect, the clustering groups clusters of entities (e.g., researchers, etc.) associated with the embeddings. For example, a cluster can be related to a specific research area such as a disease or practice area. The clustering engine 225 generates a similarity measure of the various entities to create the corresponding clusters. In some cases, the clustering engine 225 can apply the clustering to only a portion of the entities because the clustering may be mutually exclusive. The embeddings and other data related to an investment entity may not be clustered because the investment entity spans multiple research types. For example, a university may have a hospital that prioritizes research into fundamentally different research clusters.

In some aspects, the cognition processing system 200 is configured to identify concepts associated with each cluster using a classification engine 230. The classification engine 230 analyzes the data and embeddings in each cluster to identify at least one branch associated with a classification taxonomy. In some cases, the classification taxonomy can be focused on scientific taxonomies, business and economic, scientific, and education and academic taxonomies. Non-limiting examples of a classification taxonomy include medical subject headings (MeSH), cooperative patent classification (CPC), and so forth.

In one illustrative aspect, the classification engine 230 can use term frequency inverse discrete function (TF-IDF) to identify relevant terms within the content and determine at least one classification based on the relevance of the terms with respect to the various classifications in the corresponding taxonomy. In some cases, the classification engine 230 provides a confidence level of multiple classifications.

In another illustrative aspect, the classification engine 230 may use a large language model (LLM) to extract key terms from the content using the various attention techniques. For example, a self-attention technique can be used to identify the relevant terms within the document, and a cross-attention technique can be used to compare the relevant terms to other taxonomies to identify a classification. The key terms can be used to identify at least one classification in the corresponding taxonomy that corresponds to the content.

In some aspects, a modeling engine 235 is configured to model the various datasets produced by the cognition processing system 200 across different dimensions. For example, the modeling engine 235 can models multiple researchers over a period of time to identify contributions within one or more research areas. The research fields can be an explicit classification associated with one or more taxonomies, groups of researchers, and so forth. In one illustrative aspect, the modeling engine 235 models the identified clusters over time to identify trends across various dimensions. A simple example includes modeling a scientific concept (e.g., polymer nanoparticles) with respect to number of grants, number of publications, number of business entities, and the number of patents over time to identify trends over time. For example, FIG. 7 illustrates an example that identifies the various metrics of the research based on grants, patents, and the number of early-stage companies based on grant dollars.

According to some aspects, the modeling engine 235 is configured to model each set of data using the principles of celestial mechanics. In one aspect, the modeling engine 235 is configured to treat the various knowledge domains (e.g., classifications, clusters, etc.) similar to objects in celestial mechanics to understand and predict movements and interactions of the various concepts within the cognition processing system 200. For example, the cognition processing system 200 can identify motions of the clusters over time enable an understanding of how a research area or topic has changed and predict how the research area will change.

In some aspects, the modeling engine 235 can include predictive models that use the celestial mechanics principles to predict the future motion of research areas based on past data. In one example, ML algorithms can be used to analyze large datasets of the various knowledge domains (e.g., clusters, embeddings) to identify patterns and make predictions about future research events.

In one illustrative example, the modeling engine 235 can treat time slices of clusters as point clouds and register point clouds onto a coordinate system using point-set registration techniques. In this case, the point clouds are in a non-Euclidean space and represented by a large number of vectors (e.g., 728 dimensions) For example, the modeling engine 235 can use a correspondence-based registration to introduce time as a dimension, identify kinematic properties of the point clouds in non-Euclidean space, and model rate of changes of various kinematic properties in non-Euclidean space. Non-limiting examples of kinematic properties include cluster volume (using a volume of an n-dimensional point cloud), density, velocity (per n-dimension), temperature, viscosity (e.g., a rate of shape change per unit time), etc.

For example, the modeling engine 235 can model cluster centroid relative position and velocity with respect to other cluster centroids in n-dimensions to identify potential overlap of technology in the future. In some aspects, the temperature corresponds to a parameter that changes over time. For example, the publications, grants, patents, and startups illustrated in FIG. 7 corresponds to different temperatures in non-Euclidean space. In some aspects, a density corresponds to an axis per a predefined quantitative unit. Examples of a quantitative units include dollars, researchers, patents, and so forth. For example, the publications per grant dollar, patents per grant dollar, and startups per grant dollar are illustrated in FIG. 7 are non-limiting examples of density associated with the point clouds. Although dollars are described, quantitative can include a number of employees, number of researchers, number of patents, and so forth.

In some aspects, a centroid of a cluster can be determined based on different dimensional components. For example, the centroid of a cluster can be represented at different points in time based on its motion over time. The motion can include relative position, velocity, acceleration, jerk and other movement oriented measurements over time.

In some cases, the clustering engine 225 and the modeling engine 235 can be part of the modeling engine 235. For example, the output from the dimension reduction engine 220 can be fed into the modeling engine 235, and the modeling engine 235 can orchestrate the modeling based on classification and clustering the different data.

Figure 3:
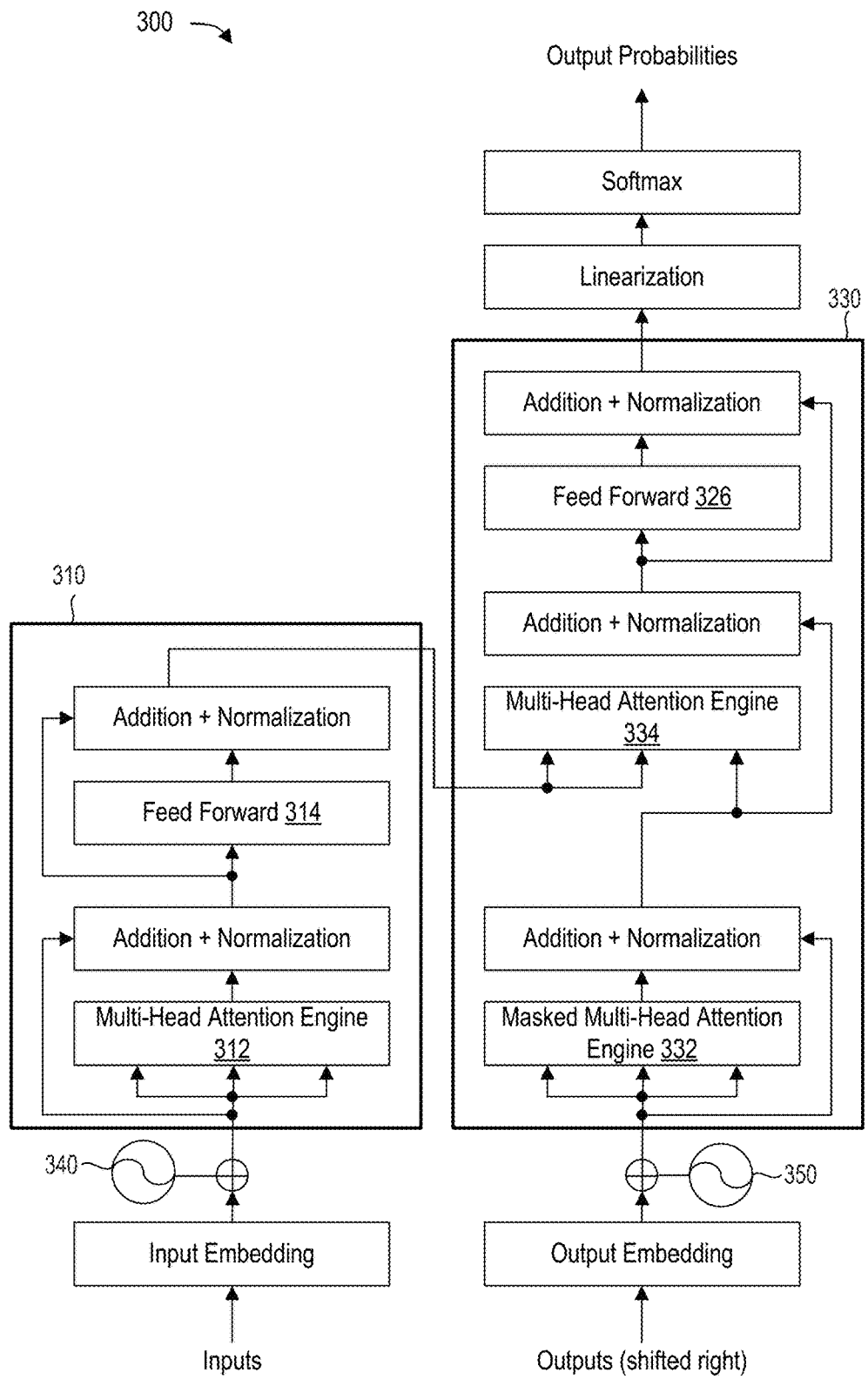
FIG. 3 is a block diagram of an example transformer in accordance with some aspects of the disclosure.

FIG. 3 is a block diagram of an example transformer in accordance with some aspects of the disclosure.

In a convolutional neural network (CNN) model, the number of operations required to relate signals from two arbitrary input or output positions grows in the distance between positions, which makes learning dependencies at different distant positions challenging for a CNN model. A transformer 300 reduces the operations of learning dependencies by using an encoder 310 and a decoder 330 that implement an attention mechanism at different positions of a single sequence to compute a representation of that sequence. An attention function can be described as mapping a query and a set of key-value pairs to an output, where the query, keys, values, and output are all vectors. The output is computed as a weighted sum of the values, where the weight assigned to each value is computed by a compatibility function of the query with the corresponding key.

In one example of a transformer, the encoder 310 is composed of a stack of six identical layers and each layer has two sub-layers. The first sub-layer is a multi-head self-attention engine 312, and the second sub-layer is a fully connected feed-forward network 314. A residual connection (not shown) connects around each of the sub-layers followed by normalization.

In this example transformer 300, the decoder 330 is also composed of a stack of six 6 identical layers. The decoder also includes a masked multi-head self-attention engine 332, a multi-head attention engine 334 over the output of the encoder 310, and a fully connected feed-forward network 326. Each layer includes a residual connection (not shown) around the layer, which is followed by layer normalization. The masked multi-head self-attention engine 332 is masked to prevent positions from attending to subsequent positions and ensures that the predictions at position i can depend only on the known outputs at positions less than i (e.g., auto-regression).

In the transformer, the queries, keys, and values are linearly projected by a multi-head attention engine into learned linear projects, and then attention is performed in parallel on each of the learned linear projects, which are concatenated and then projected into final values.

The transformer also includes a positional encoder 340 to encode positions because the model does not contain recurrence and convolution and relative or absolute position of the tokens is needed. In the transformer 300, the positional encodings are added to the input embeddings at the bottom layer of the encoder 310 and the decoder 330. The positional encodings are summed with the embeddings because the positional encodings and embeddings have the same dimensions. A corresponding position decoder 350 is configured to decode the positions of the embeddings for the decoder 330.

In some aspects, the transformer 300 uses self-attention mechanisms to selectively weigh the importance of different parts of an input sequence during processing and allows the model to attend to different parts of the input sequence while generating the output. The input sequence is first embedded into vectors and then passed through multiple layers of self-attention and feed-forward networks. The transformer 300 can process input sequences of variable length, making it well-suited for natural language processing tasks where input lengths can vary greatly. Additionally, the self-attention mechanism allows the transformer 300 to capture long-range dependencies between words in the input sequence, which is difficult for RNNs and CNNs. The transformer with self-attention has achieved results in several natural language processing tasks that are beyond the capabilities of other neural networks and has become a popular choice for language and text applications. For example, the various large language models, such as a generative pretrained transformer (e.g., ChatGPT, etc.) and other current models are types of transformer networks.

Figure 4:
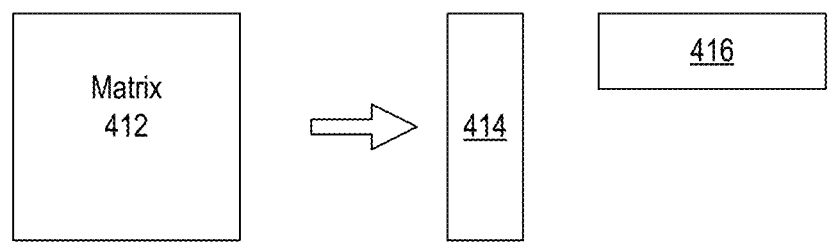
FIG. 4 is a block diagram of various encoders that can be used to identify features of unstructured documents in accordance with some aspects of the disclosure.
Figure 4:
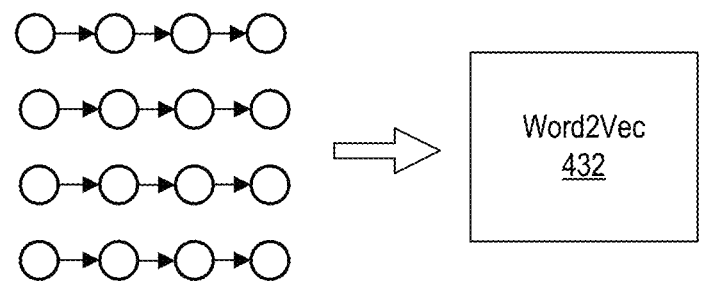
Figure 4:
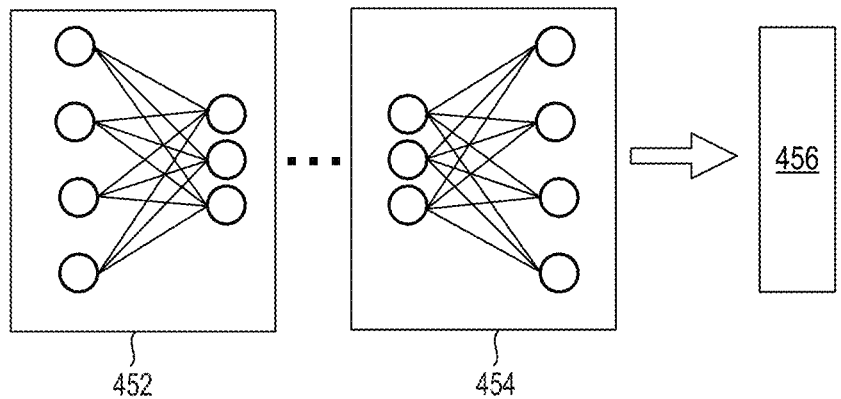

FIG. 4 is a block diagram of various encoders that can be used to identify features of unstructured documents in accordance with some aspects of the disclosure. In particular, FIG. 4 includes a block diagram of a matrix encoder 410, a random walk encoder 430, and a neural network encoder 450. According to some aspects of the disclosure, the encoders can be used in various parts of the cognition processing system 200, such as the dimension reduction engine 220, or may be used in the clustering engine 225.

The matrix encoder 410 identifies the most important features of data (e.g., most important embeddings) and reduces the features into a lower dimensional representation. Non-limiting examples of techniques incorporated into the matrix encoder 410 include singular value decomposition (SVD), PCA, or autoencoders to perform the transformation. For example, the matrix encoder 410 converts a matrix 412 into a column 414 of components and a row 416 of features associated with the components. The lower-dimension representation of the matrix 412 can be used to assist in clustering, classification, and visualization, as well as improve the efficiency of computations.

The random walk encoder 430 simulates a random walk process on graphs or networks to generate sequences of node visits that are used as input into a neural network, such as word2vec 432 to produce a word embedding. The random walk process involves starting at a randomly chosen node in the graph and moving to a neighboring node at each step according to a certain probability distribution. By repeating this process for multiple iterations, a sequence of node visits is generated for each starting node. These sequences are then used as the input data.

The neural network encoder 450 is a trained neural network that has learned mappings between a high-dimensional input into a lower-dimensional space 456. The neural network encoder 450 includes an encoder 452 and may include a decoder 454. Each encoder of the neural network encoder 450 includes several layers of artificial neurons that perform a non-linear transformation on the input data and reduce high-dimensional data to lower data by learning based on various techniques, such as backpropagation. The neural network encoder can be trained using various optimization techniques to minimize a loss function that measures the difference between the original high-dimensional data and the reconstructed data. The neural network encoder 450 provides flexibility and ability to learn complex and non-linear mappings between the input data and the encoding result but requires large amounts of training data, computational resources, and careful tuning of the network architecture and hyperparameters.

The matrix encoder 410, the random walk encoder 430, and the neural network encoder 450 each have advantages and disadvantages. The matrix encoder 410 is computationally efficient and can handle large datasets but may not be as effective in capturing semantic information or feature interactions. The random walk encoder 430 is effective in capturing structural information and node similarities in graphs but may not be suitable for other types of data. The neural network encoder 450 is flexible and can learn complex mappings between the input data and the encoding but may require large amounts of training data and computational resources.

Figure 5:
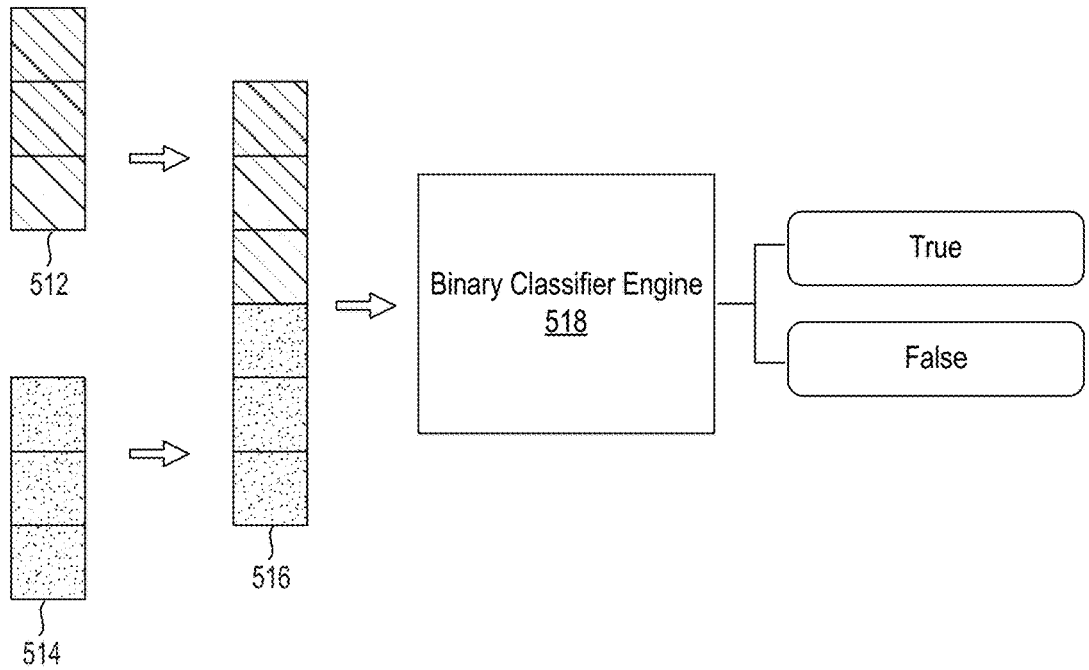
FIG. 5 is a block diagram of various classifiers that can be used to identify one or more classifications from one or more taxonomies in accordance with some aspects of the disclosure.
Figure 5:
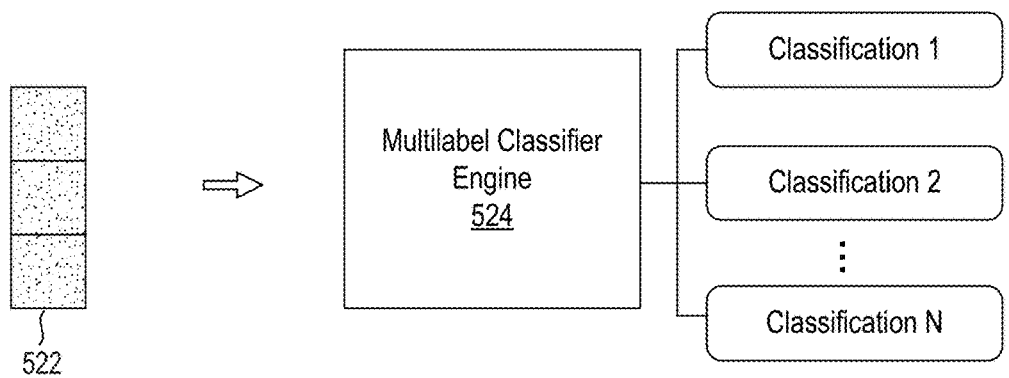

FIG. 5 is a block diagram of various classifiers that can be used to identify one or more classifications from one or more taxonomies in accordance with some aspects of the disclosure. In particular, FIG. 5 includes a binary classifier 510 and a multilabel classifier 520.

The binary classifier 510 is configured to classify data into two categories that is generally represented by true or false. An example of a binary classification includes a classification of an email as spam or not spam. Other examples of binary classification include sentiment analysis (e.g., positive review or negative review) and fraud detection.

One example of a binary classifier includes concatenating a first embedding 512 and a second embedding 514 into a summed embedding 516 and then executing a binary classifier engine 518, which determines whether the summed embedding 516 corresponds to a characteristic that the binary classifier engine 518 is trained to detect.

A multilabel classifier 520 is configured to classify data into multiple categories or labels, where each example may belong to more than one label. The classifier is trained using a labeled dataset, where each example is associated with a set of binary labels. The classifier then learns a decision boundary for each label in the input space. An example of a multilabel classifier includes a color classification (e.g., red, green, etc.), a music genre classification, a car type, etc. The multilabel classifier 520 is effective in capturing the complex relationships and dependencies among the labels, as well as handling imbalanced and overlapping label distributions.

An example of a binary classifier includes inputting an embedding 522 into a multilabel classifier engine 524, which analyzes the embedding based on trained data to identify the corresponding classification (e.g., color, type, etc.).

In some aspects, the binary classifier 510 and the multilabel classifier 520 can be implemented at various points of the cognition processing system 200 and may be used to determine the clustering of various embeddings, such as research areas.

Figure 6:
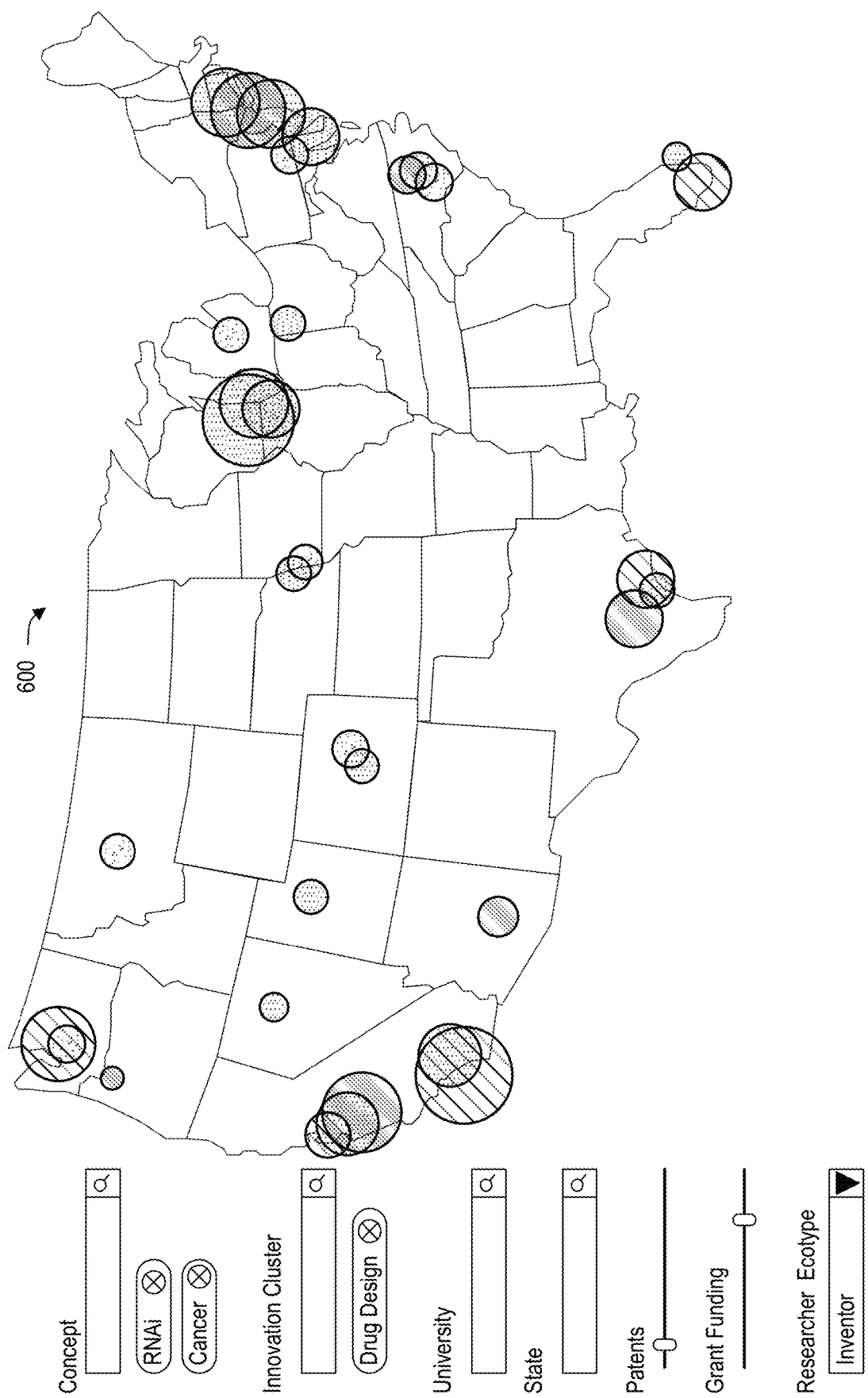
FIG. 6 is an example visualization that can be provided by the cognition management system in accordance with some aspects of the disclosure.

FIG. 6 is an example visualization 600 that can be provided by the cognition management system in accordance with some aspects of the disclosure. One example of a visualization is a map that identifies innovation clusters based on a plurality of inputs. A cluster is a labeled result of the clustering engine. The visualization identifies clusters of research based on one or more parameters input into a client application that interfaces with the cognition management system. For example, the cognition management system may generate the visualization 600 or provide data to generate the visualization 600 (e.g., at a remove application) based on an input identifying a plurality of research or technical concepts (e.g., cancer and RNAi) and innovation clusters (e.g., drug design), and the zones illustrated in the visualization 600 illustrate the quantity of research associated with different entities (e.g., universities) and various research types. In this manner, the visualization 600 enables a user to visually perceive concentrations of overlapping research types and may identify a research nexus.

In one illustrative aspect, the visualization 600 may also produce a table of results that identifies researchers, groups of researchers, and other information that can assist in surfacing information from the cognition management system. The cognition management system can also provide information that supports the visualization 600, such as a table of researchers, their respective research organization, publication, and innovation information (e.g., number of patents per year, number of publications per year, funding, number of citations per year).

FIG. 7 is an example visualization 700 related to innovation clusters over time that can be provided by a cognition management system in accordance with some aspects of the disclosure. In some aspects, the visualization 700 includes a plurality of innovation clusters having one or more associated classifications. The visualization 700 provides a time-based overview of research information (e.g., publications, grants), intellectual property development, and business development (e.g., the number of early-stage companies or startups), as well as economic information. For example, the visualization 700 identifies that the extracellular vesicles cluster produces more early-stage companies per grant dollar spent and with less intellectual property as compared to other clusters.

Figure 8:
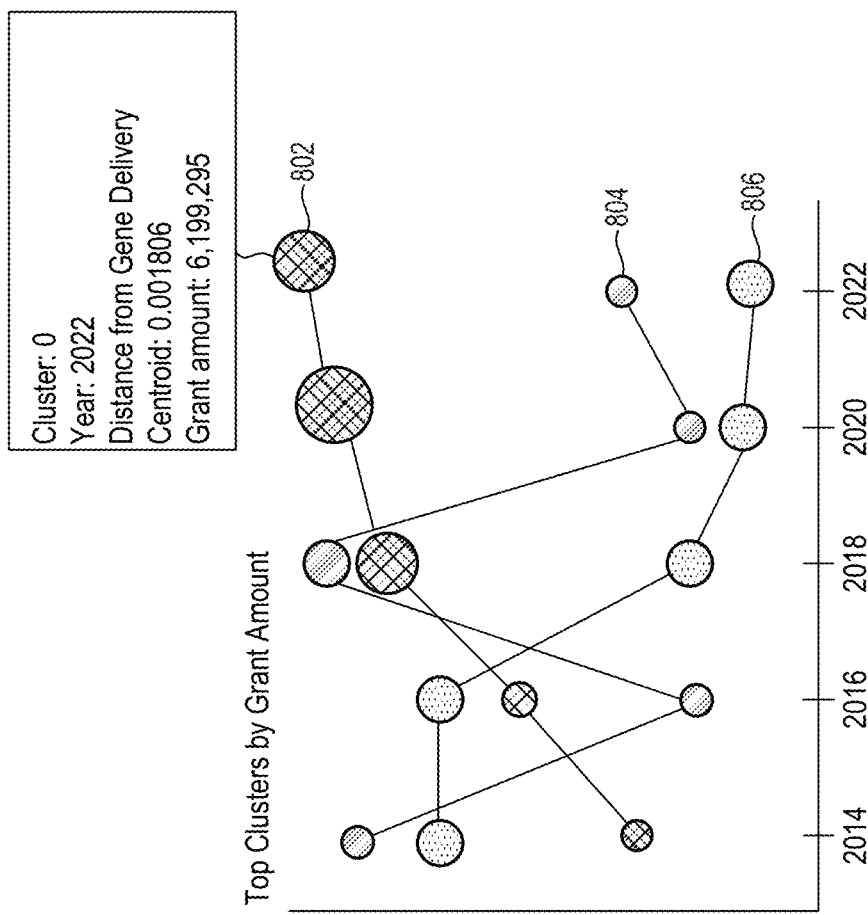
FIG. 8 is an example visualization 800 related to grant funding and research over time that can be provided by a cognition management system in accordance with some aspects of the disclosure
Figure 8:
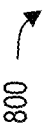

FIG. 8 is an example visualization 800 related to grant funding and research over time that can be provided by a cognition management system in accordance with some aspects of the disclosure. The visualization 800 provides a graph illustrating publication based on data point size associated with clusters 802, 804, and 806. In this case, the data point size at each year represents the number of publications within this cluster, and the position on the Y axis indicates grant funding. The visualization 800 indicates that the publications in the cluster 802 increased over time and grant funding increased as well. In particular, between 2016 and 2018, the publication activity increased significantly, indicating that a breakthrough may have occurred, which tracks with the increased grant funding. Grant funding associated with the cluster 806 decreased while maintaining roughly the same publication volume, indicating that cluster 806 is declining.

Figure 9:
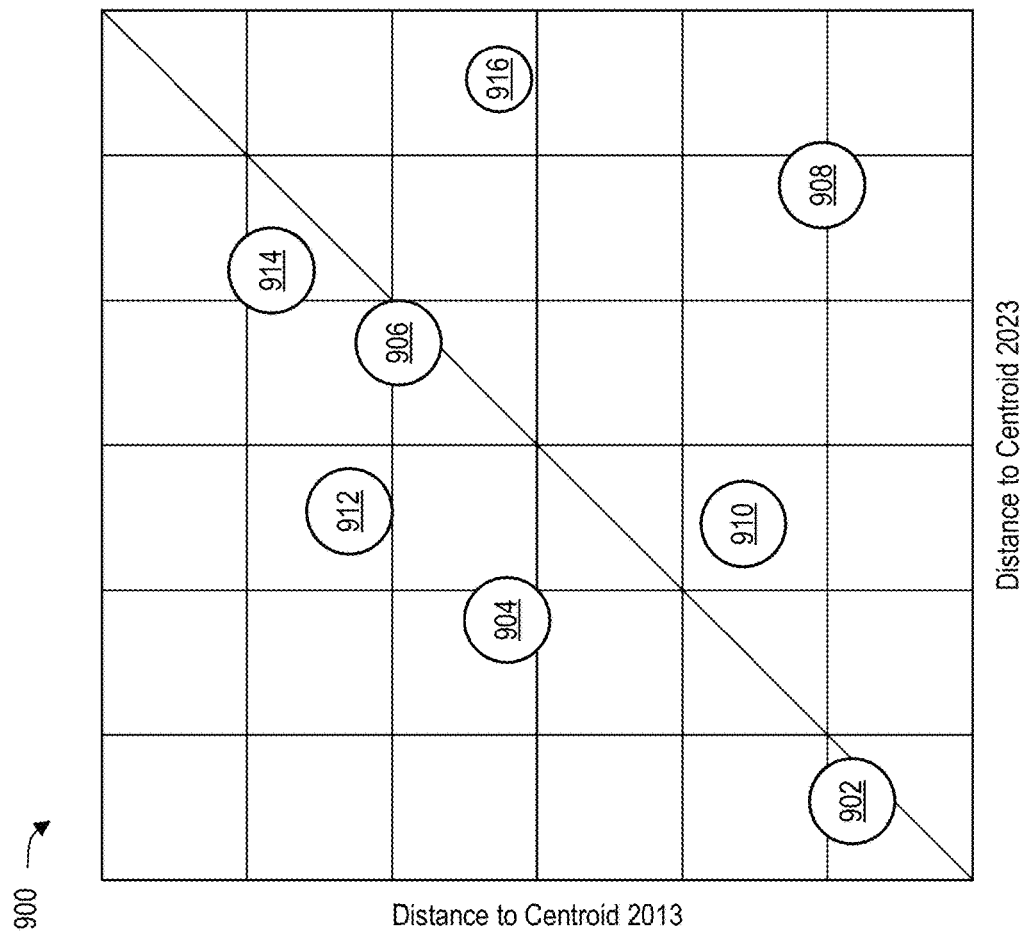
FIG. 9 is an example visualization related to researcher analysis over time that can be provided by a cognition management system in accordance with some aspects of the disclosure.

FIG. 9 is an example visualization 900 related to researcher analysis over time that can be provided by a cognition management system in accordance with some aspects of the disclosure. In some aspects, the visualization 900 identifies researchers 902, 904, 906, 908, 910, 912, 914, and 916 and the evolution of their research over a period of time with respect to the research field. In this case, the analysis of the visualization 900 is determined based on the evolution of the field. For example, if the field is dynamic and shifting significantly, the number of publications by researcher 902 is significant over the course of the decade and is a pioneer of the research field. However, if the field is relatively stagnant, the researcher 908 would be a pioneer of that research field.

In this case, the position on the visualization 900 corresponds to a researcher's status within a research field and can identify the importance of the researcher based on various parameters. The cognition management system enables the visualization 900 based on an analysis of unstructured information across different domains. This type of analysis cannot be performed manually because of the diverse sources of information, the unstructured nature of the content, and the amount of time would be impracticable to do it without ML-based techniques.

Figure 10:
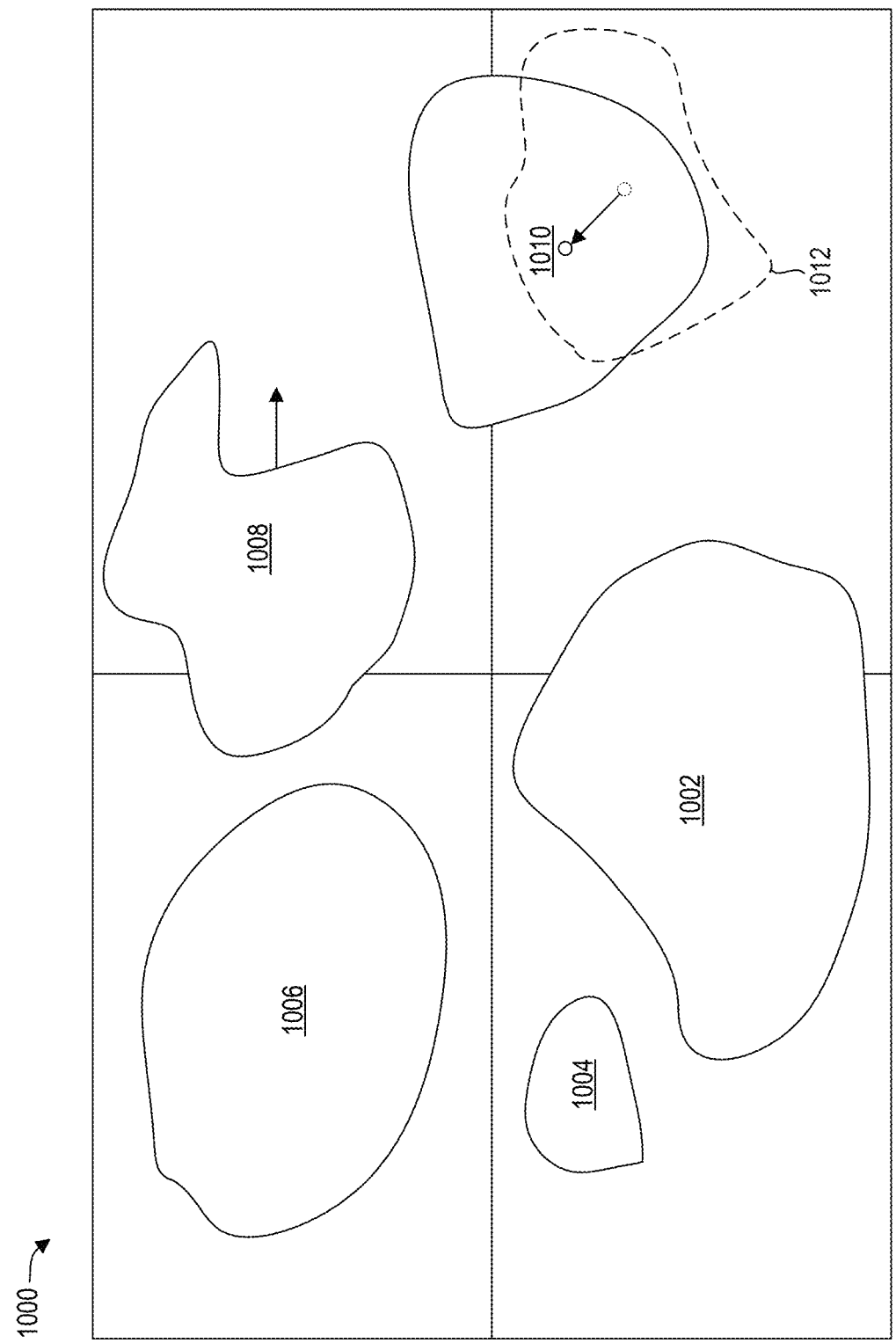
FIG. 10 is an example visualization related to cluster analysis over time that can be provided by a cognition management system in accordance with some aspects of the disclosure.

FIG. 10 is an example visualization 1000 related to cluster analysis over time that can be provided by a cognition management system in accordance with some aspects of the disclosure. In some aspects, the visualization 1000 illustrates a plurality of clusters 1002, 1004, 1006, 1008, and 1010. In this case, each cluster represents a multidimensional model and includes a number of parameters that are modeled based on the principles of celestial mechanics and other physical aspects. For example, each cluster can be associated with a volume, location, velocity, acceleration, jerk, and other parameters across multiple dimensions, which can be more than a number of physical cartesian coordinates. As shown in FIG. 10, cluster 1010 moves in different directions and changes in shape and area, but other components can change that cannot be reflected in a 2D line diagram.

Each cluster can also include other parameters that represent different attributes of the cluster over a period of time. For example, each cluster can have a density that identifies the proximity of the various data points. In some aspects, a higher density indicates a substantial amount of research and may be indicative of a crowded research area. In other cases, each cluster also has a viscosity, which identifies the fluidity of concepts within the clusters, or the rate at which new concepts are added or change over the period of time. Dense, but viscous clusters indicate changing technology areas. Other aspects include movement of the clusters, which can identify research and technology areas that while different may have significant opportunities in the future.

In some aspects, visualizations of the cognition management system can enable participants to make informed decisions that were previously impossible without ML-based techniques.

Figure 11:
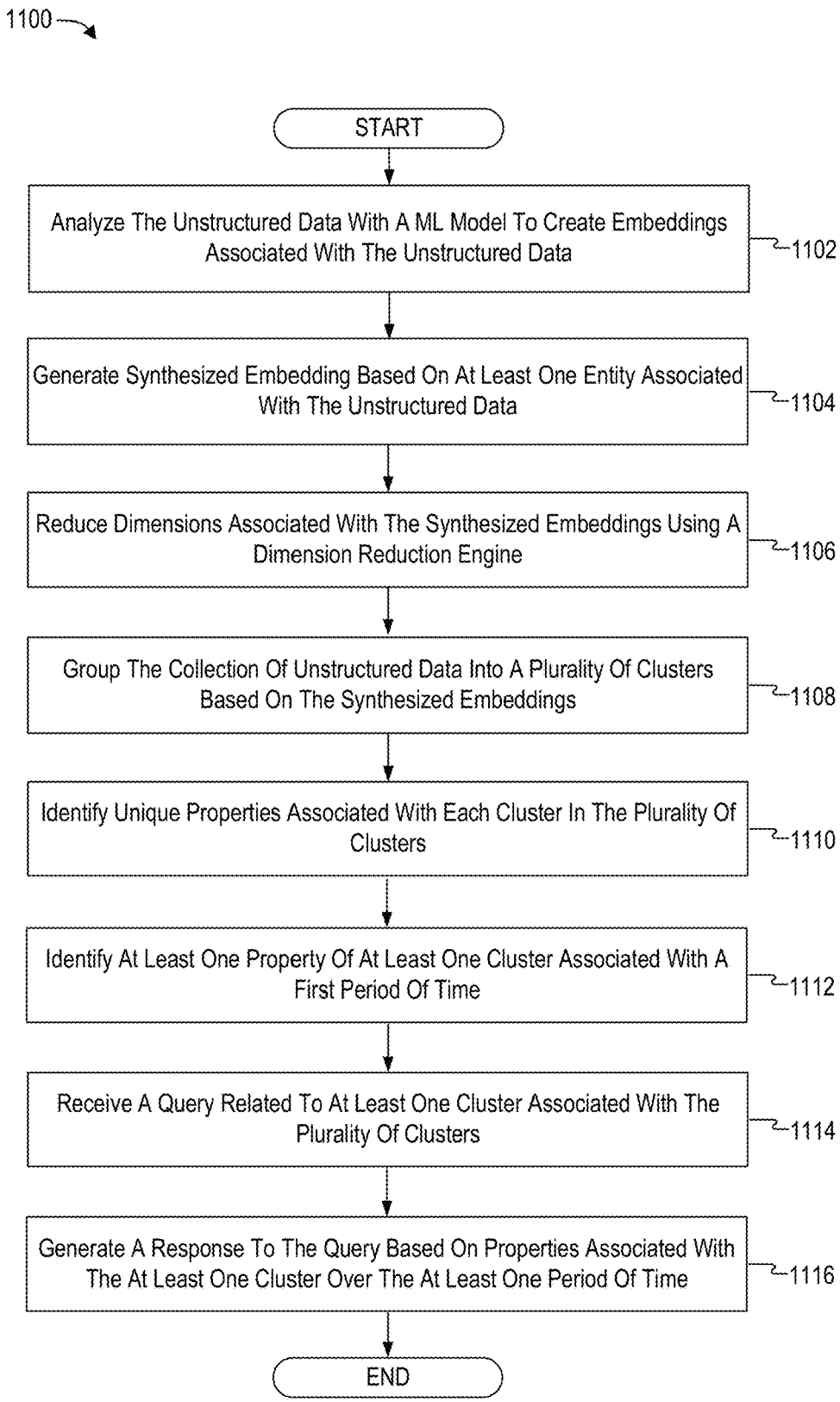
FIG. 11 illustrates an example method of a cognition management system in accordance with some aspects of the disclosure.

FIG. 11 illustrates an example method 1100 of a cognition management system in accordance with some aspects of the disclosure. The method 1100 can be performed by a computing device having network communication capabilities and may be configured as a service separate from a client system, or may be integrated into the client system. For instance, the computing system 1500 may be configured to perform all or part of the method 1100.

Although the example method 1100 depicts a particular sequence of operations, the sequence may be altered without departing from the scope of the present disclosure. For example, some of the operations depicted may be performed in parallel or in a different sequence that does not materially affect the function of the method 1100. In other examples, different components of an example device or system that implements the method 1100 may perform functions at substantially the same time or in a specific sequence.

According to some aspects, the computing system may receive a collection of unstructured data. According to non-limiting aspects of the disclosure, the receiving of the collection of unstructured data can occur using conventional techniques such as purchasing a commercial database, scraping the information off public resources, obtaining access to repositories, and so forth. Non-limiting examples of unstructured data include at least one scientific journal article, clinical data, financial data, regulatory data, patent applications, granted patents, standards committee papers, whitepapers, datasheets, investor report data, marketing data, and researcher data. The unstructured generally is received from different sources and does not have any common structure. In some cases, as noted above, the data may be semi-structured, such as an XML file without any schema, a JSON file, a structured database (e.g., an SQL database), or an unstructured database (e.g. a document database). For example, one or more tables of an SQL database can be received with or without information that links individual rows in the table to one or more other entities (e.g., a one-to-many relationship).

At block 1102, the computing system may analyze the data with an ML model to create embeddings associated with the data at block 1104. In one example, the ML model may include a transformer model that is trained to create the embeddings associated with the data based on the attention of the words within the unstructured data. The transformer model encodes the word into vector space (e.g., an embedding) that uniquely identifies concepts in a number of dimensions to identify similar words. Non-limiting examples of transformer models include BERT, T5, BioBERT, SciBERT, and the SPECTER model. For example, one or more models associated with the huggingface repository can be used at block 1102. Non-limiting examples of data in this example include papers, publications, patents, grants, and so forth.

In some cases, the computing system may identify a date associated with each document from the document or from external information related to the document. For example, the transformer model may be able to extract a publication date based on a heading of the unstructured data. In another aspect, metadata related to a location (e.g., a URL) of the unstructured data may include the data or one or more links to the unstructured document may include a date.

At block 1104, the computing system may generate synthesized embedding based on at least one entity associated with the unstructured data at block 1106. According to some aspects, the embedding is determined by collecting all data associated with the entity and performing an operation that summarizes each data item. An entity can be at least one a researcher, a group of researchers, a business entity, a research entity, a collaboration entity, a university, and a government entity. In one example, if the entity is a specific researcher, the embeddings are determined based on an average of all documents that are associated with that specific researcher. In another example, if the entity is a department within a university (e.g., a chemical science or chemical engineering department), the embeddings are determined for each agent, employee, or researcher associated with that department. In some cases, the synthesized embeddings may be combined with different types of queries during inference. In other cases, the generating of the synthesized embedding can be omitted.

At block 1106, the computing system may reduce dimensions associated with the embeddings associated with the data. Non-limiting examples of dimension reduction include UMAP, PCA, non-negative matrix factorization, and so forth.

At block 1108, the computing system groups the data into a plurality of clusters based on the embeddings at block 1108. In some aspects, the grouping can occur using various techniques, such as by applying a clustering technique (e.g., a k-means technique, gradient-boosted tree, density-based tree). In some cases, the data can represent different features mapped into a common space and can have multiple relationships. For example, a single unstructured data point (e.g., a paper) can be associated with different technologies, different entities, and so forth. A cluster of nodes within a space can identify correlations, strong performers (e.g., technical leaders), emerging technologies, and emerging leaders.

At block 1110, the computing system may identify unique properties associated with each cluster in the plurality of clusters. For example, the computing system may determine a priority of each embedding of the first cluster based on a classification system and unstructured data associated with the first cluster.

In some aspects, block 1110 can include providing the embeddings to a large language model and receiving an identifier of the first cluster from the large language model.

At block 1112, the computing system may identify at least one property of at least one cluster associated with a first period of time. In some aspects, the computing system can model the clusters over time based on the principles of celestial mechanics by treating time slices of the cluster as a point cloud. For example, the computing system may register at least one point cloud using various point-set registration techniques. In one example of block 1112, the computing system may determine a registration based on a first point cloud and a second point cloud that will be compared, apply the registration to the first point cloud and the second point cloud, and determine a difference based on between the registration of the first point cloud and the second point cloud. A correspondence-based registration may be used to allow time to be introduced as a dimension in the point cloud, which allows time slices to be extracted based on selecting data along an axis.

The computing system can determine a number of parameters of a cluster using the principles of kinematics in a non-Euclidean space. Examples of kinematics include at least one of a position of the first cluster, a velocity of the first cluster, a volume of the first cluster, a rate of volume change of the first cluster; a rate of positional change of the first cluster relative to at least another cluster; a temperature of the first cluster associated with a parameter over time, a density of the first cluster based on a quantitative unit over time, a rate of temperature change of the first cluster, or a shape of the first cluster, or a rate of shape change of the first cluster. As described above, different dimensions of the vectors can be mapped into the kinematics to determine the various parameters. For example, various examples of density described above have a dimension related to grant dollars or another quantitative unit.

In some aspects, the computing system may generate a second point cloud for unstructured data associated with the first cluster within a second period of time. In this case, the rates of changes over time can be measured. The computing system may also determine a second point cloud a second point cloud for unstructured data associated with a second cluster within a first period of time. In this case, the computing system can compare the clusters at a specific point in time. The computing system can also compare the first and second clusters over time to identify opportunities.

At block 1114, the computing system may receive a query related to at least one cluster associated with the plurality of clusters. For example, the query identifies at least one cluster and at least one parameter to evaluate the at least one cluster. Examples of clusters are described above and illustrated in FIG. 6.

At block 1116, the computing system may generate a response to the query based on properties associated with at least one cluster over at least one period of time at block 1116. The response comprises at least one of a graph of at least the first cluster, a projection illustration for the first period of time associated with at least the first cluster, a video depicting at least the first cluster mapped to a coordinate system, and changes to the first cluster with respect to time, statistics associated with the first cluster, a heat map including at least the first cluster, a list identifying a plurality of people or entities corresponding to the query.

Figure 12:
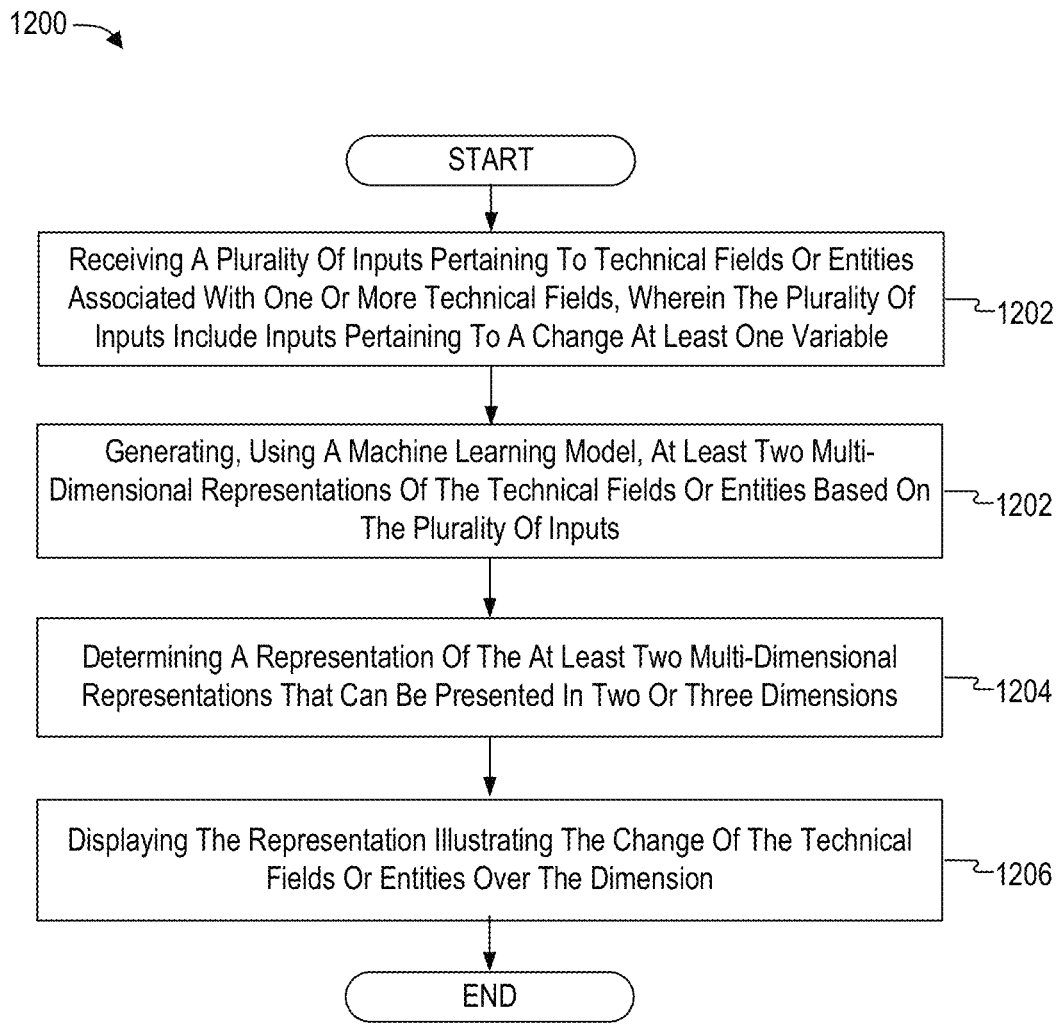
FIG. 12 is a conceptual diagram illustrating an architecture and deployment of a cognition management system in accordance with some aspects of the disclosure.

FIG. 12 is another example method 1200 of a cognition management system in accordance with some aspects of the disclosure. In some aspects, the method 1200 illustrates runtime and inference operation engines and ML models. FIG. 12 will be explained in conjunction with FIGS. 13A to 13E, which are conceptual illustrations of content the cognition management system can generate.

Figure 13A:
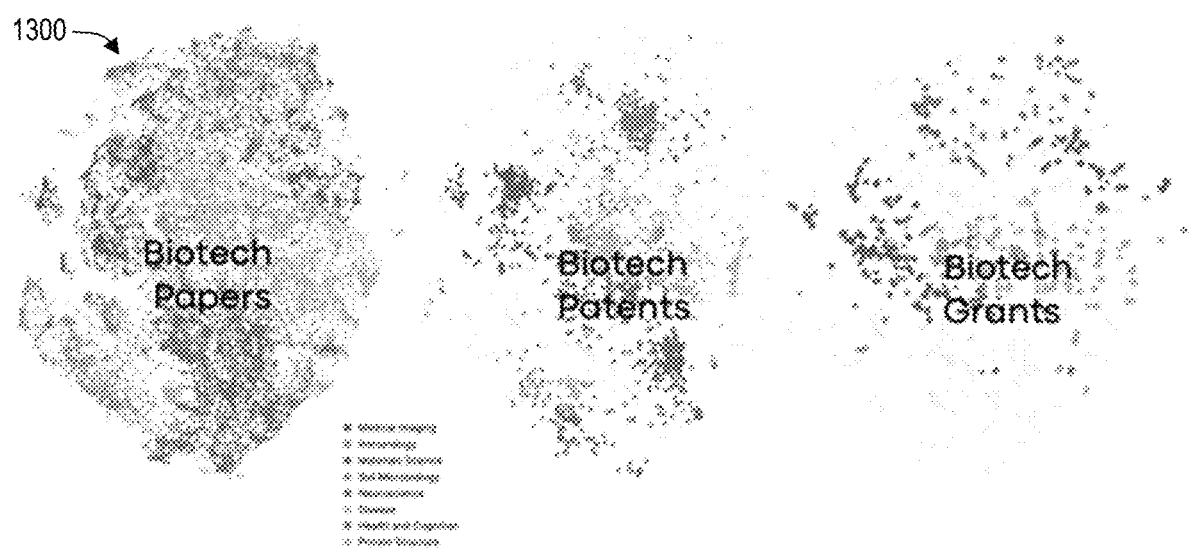
FIGS. 13A to 13E are conceptual illustrations of content the cognition management system can generate in accordance with some aspects of the disclosure.
Figure 13B:
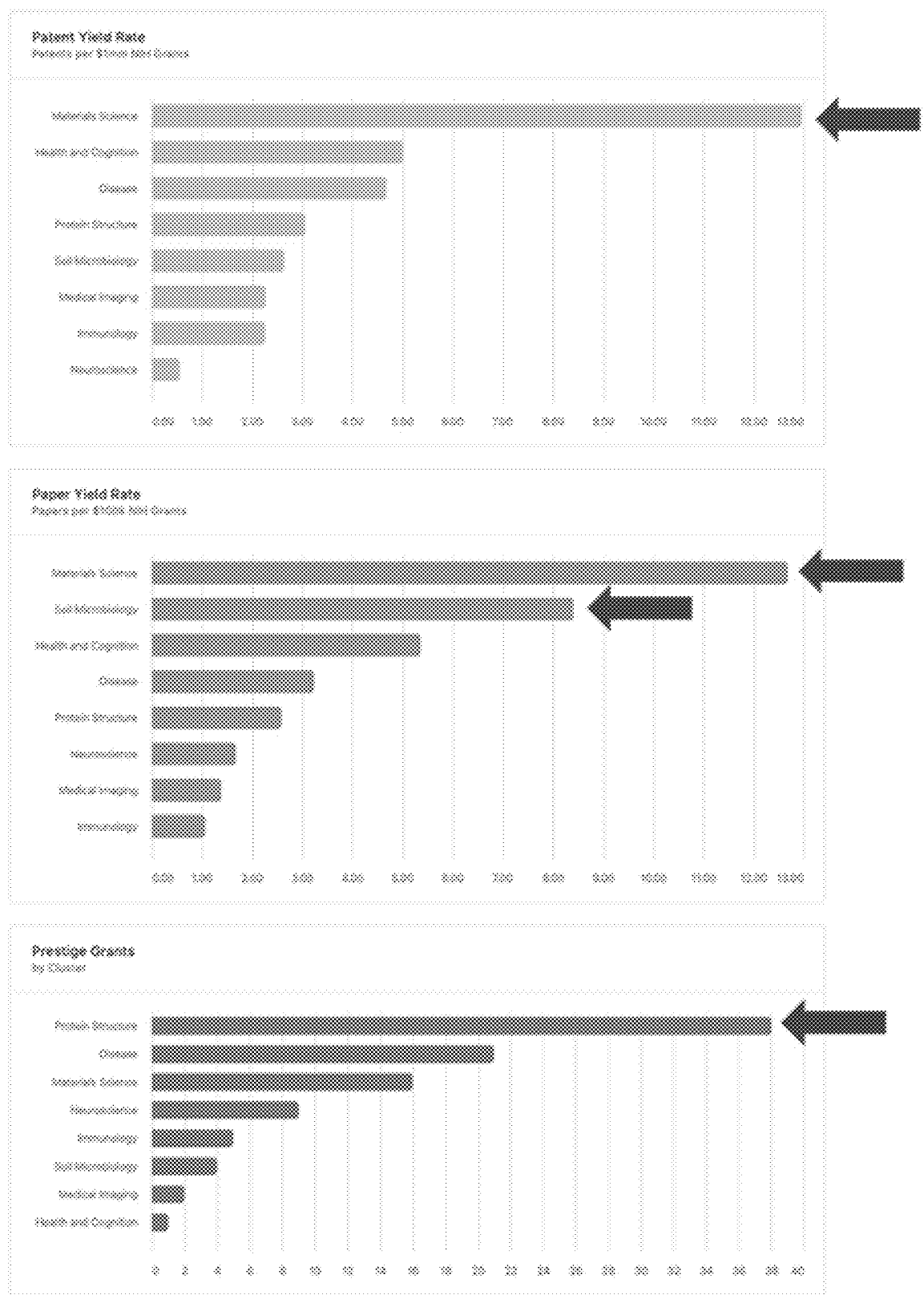

Initially, a user interface is provided to a user for providing a plurality of inputs. A non-limiting example of a user interface is shown in FIG. 6. At block 1202, the computing system receives a plurality of inputs pertaining to technical fields or entities associated with one or more technical fields. The plurality of inputs can include inputs pertaining to a change at least one variable. For example, the at least one variable can be units of time, but may also be other types of dimensions such as grants, patents, or other units that would be suitable for comparing research and development activities. For example, the temporal space vector maps (TVSMs) are illustrated in FIG. 13A illustrates the technical concepts aligned in time and based on different feature vectors. The different feature vectors represent a technical concept or contributor (e.g., descriptions of research papers, patents, grants, clinical trials, startups, drugs, and inventors) in FIG. 13A are clustered into a normalized space (e.g., clustered based on their features), and assigned a topic (e.g., medical imaging, immunology, materials science, soil microbiology, neuroscience, disease, health and cognition, protein structure) based on the feature vectors. The clusters are then normalized and mapped (e.g., flattened) into a 2D representation. For example, each node (or point) in FIG. 13A represents a technical content such as a grant, a technical paper, and/or a patent application or publication. In addition, the technical concepts can be separated based on data source as shown in FIG. 13A to allow a visual understanding of the research activities. In some cases, the feature vectors can also be referred to as metaknowledge artifacts.

In some cases, each node (e.g., person) is assigned a unit vector based on the sum or a selection of feature vectors (e.g., their metaknowledge artifacts) associated with that person.

At block 1204, the computing system may obtain, using a machine learning model, a multi-dimensional representation of the technical fields or entities based on the plurality of inputs. The multi-dimensional representation may includes content items at different locations and different dimensions, and each content item can be associated with a node (e.g., an entity). In some cases, a node can be represented at different times to illustrate changes over time. The dimension can also include funding (e.g., grants), topics (e.g., research concepts), commercialization efforts, and so forth. In one example, each multi-dimensional representation may be a graph object that associates a particular topic (e.g., a person, a node representing a technical concept or an embedding, etc.) with other nodes. Each node may also include other relevant data, such as a date (e.g., publication date, priority date, etc.), a duration, and an associated research entity (e.g., a university, etc.). In one example, the vector space can be represented as a 740-dimensional vector and the various dimensions can model research and development concepts and other pertinent facts (e.g., time, entity, associations, grants, etc.).

In some aspects, the computing system (e.g., the machine learning model) may determine a topic vector associated with the plurality of inputs based on corresponding metaknowledge artifacts associated with the plurality of inputs. A metaknowledge artifact may also be referred to as unique markers associated with a particular input. For example, an input pertaining to compound semiconductors could include nanocrystal structures, binding agents, and so forth.

At block 1206, the computing system may determine a representation of the multi-dimensional representations that can be presented in two or three dimensions. In one aspect, more than three dimensions can be presented in a 2D display using various techniques. In other aspects, the computing system may generate a three-dimensional representation for display using a mixed reality device (e.g., a virtual reality headset).

In one example, to determine the representation at block 1206, the computing system may identify a group of people associated with the topic vector; determine a centroid of each person in the group of people based on centroids of the group of people at different points of the dimension; and determine a position of each person with respect to the centroids of the group of people and the different points of the at least one dimension.

At block 1208, the computing system displays the representation illustrating the change of the technical fields or entities over the dimension. For example, the computing system may, based on the example of block 1206 above, generate a scatter plot based on the positions of each person with respect to the centroid and the group of people and the different points of the at least one dimension. In this case, when the lengths with respect to the centroid are computed at different times (e.g. the changing dimension), the scatter plot includes quadrants representing leaders in the technical field and their position. For example, the top left region represents entering leaders, the top right represents central thinkers, the bottom left represents peripheral thinkers, and the bottom right represents exiting members. In some aspects, this is referred to as the Lehmann chart and can help identify future and current research opportunities.

In other cases, the dimension comprises a duration of time, and the scatter plot illustrates changes in the technical fields or entities over the duration of time. Based on the vectors associated with the particular research or development topics, the change in time, research, and other quantitative metrics can be identified to identify potential areas for technical breakthroughs and development opportunities.

In some aspects, the computing system may encode at least one property of each person in the scatter plot using at least a color or a size of a point representing a corresponding person. The color or size of the point can represent a different variable within a 2D coordinate space, such as total grant funding over a period of time, publication information (e.g., number of technical papers), patent information, or entity information (e.g., venture capital, etc.).

In other aspects, the display can be represented in different manners, such as overlapping a scatter plot. In some cases, a scatter plot itself could be a function (e.g., a functional component) in different frameworks, such as React. A scatter plot operating based on user input may provide a richer interface and enable a more fundamental understanding of multidimensional content. For example, a scatter plot can also be associated with a camera that changes the view of the scatter plot. For example, the scatter plot can be analyzed based on grants, which can change a 2D or 3D view as opposed to a camera considering a combination of factors such as patents, grants, and venture funding.

In one example, the computing system may generate a hypergroup illustrating specific research. For example, the computing system can generate the graph 1300 in FIG. 13A, which is also referred to as a Starchart™. The graph 1300 is a visual representation of innovation that maps different cognition spaces into a visual form. The graph maps different content (papers, patents, grants) into a normalized view that allows disparate information to be easily compared to identify opportunities, cognition, and other factors. In some aspects, the data forming the graph 1300 maps can be mapped into quantitative metrics. For example, the systems and techniques combine several metrics commonly used by entities or people with proprietary innovation biomarkers (not shown) to form a Biomarker Dashboard in FIG. 13E. Together, the combination of the graph 1300 data and the metrics allows further guidance to seek additional qualitative and quantitative information.

Several quick insights are easily identifiable as being pertinent and provide information usable for many different purposes. For example, the entity's Materials Science cluster generates a particularly high number of patents per NIH dollar (Patent Yield Rate), as well as papers per NIH dollar (Paper Yield Rate). In other aspect, the Soil Microbiology cluster generates a high quantity of papers per NIH dollar, but fewer patents. Also, the Protein Structure cluster clearly stands out in its ability to attract Prestige Grants—the subset of grants awarded by the NIH to the most promising science and scientists.

Figure 13C:
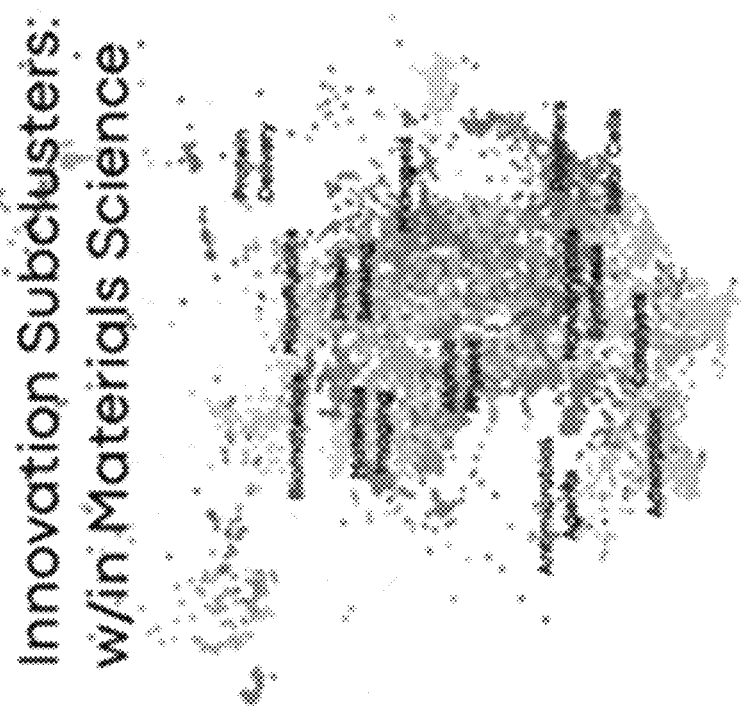
Figure 13C:
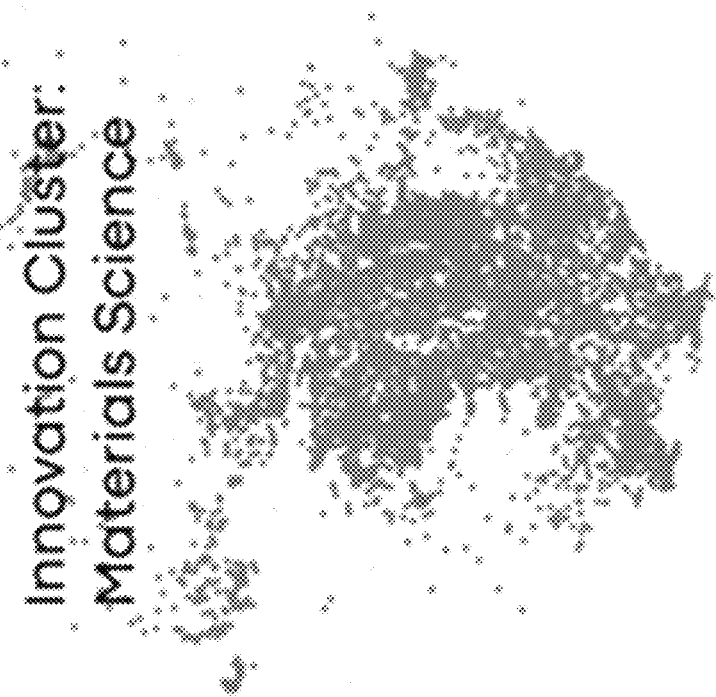
Figure 13D:
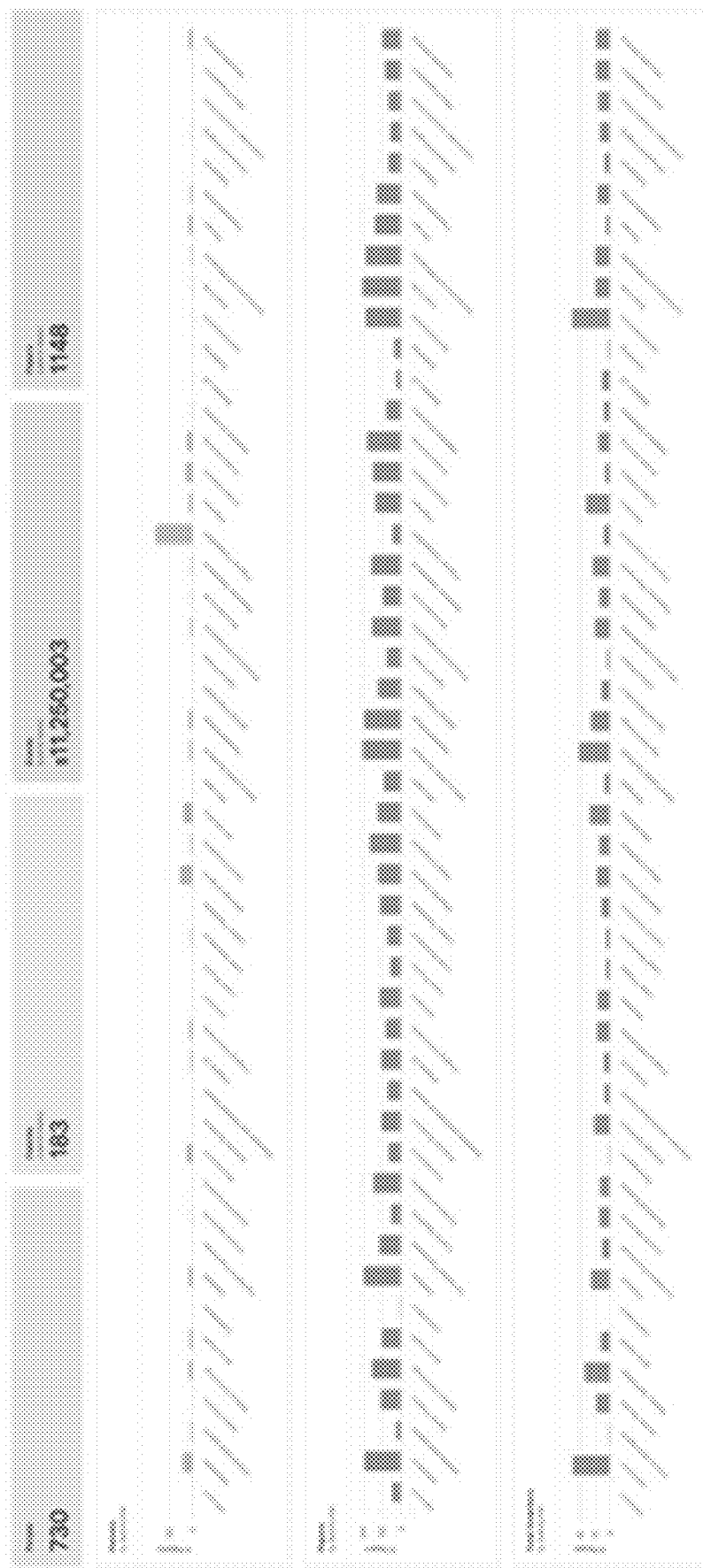

In some aspects, portions of the graph 1300 in FIG. 13A can be further enhanced. For example, FIG. 13C illustrates restricting the display of the graph to sub-groups associated within the materials science cluster. In FIG. 13C, forty seven subclusters can be mapped into the 2D space and a scorecard illustrated with the different sub-clusters can be identified as shown in FIG. 13D. In FIG. 13D, the first row shows summary statistics for the overall cluster, the second row shows the number of patents in each of forty-seven subclusters, the third row shows the number of papers for each subcluster, and the fourth row shows the number of inventors in each subcluster. Other rows and metrics are omitted for brevity.

In this example, the different qualities of the subclusters can be extrapolated, such as Polymers, and Polymer Composition account for the majority of patents within Materials Science. Further still, Protein Delivery and Protein Sensing have increasing importance to the entity. In addition, Nanocrystals, and Nanotechnology, which are Traditionally focused on industrial applications, are increasingly converging with biotech.

Figure 13E:

The disclosed systems and techniques can limit information to allow fine-grained identification of resources. For example, FIG. 13E illustrates five subclusters with the highest potential for generating technology breakthroughs. Using these subclusters, further information can be extracted based on biomarkers assigned to each individual. For example, Table 1 below illustrates eight different individuals, their career states, and technical specialties and identifies the highest potential for generating a technological breakthrough, and other information relevant to research and development.

TABLE 1

| Person | Career Stage | Subcluster |
|---|---|---|
| 1 | Early | Synthetic immunity |
| 2 | Early | Protein sensing |
| 3 | Mid | Viruses, Polymer Compounds |
| 4 | Mid | Synthetic immunity |
| 5 | Mid | Immunotherapy |
| 6 | Mid | Biomedicine |
| 7 | Late | Therapy |
| 8 | Late | Protein delivery |

Although this example describes using individual researchers as nodes, this concept can be used with other concepts including multiple regions, entities, and so forth. For example, different entities and their grant information, patent information, etc. can be used to identify target acquisitions.

The disclosed systems and techniques, including the biomarkers and various graphs, enable the surfacing of unidentified trends that have been qualitatively and quantitatively impossible using conventional techniques.

Figure 14:
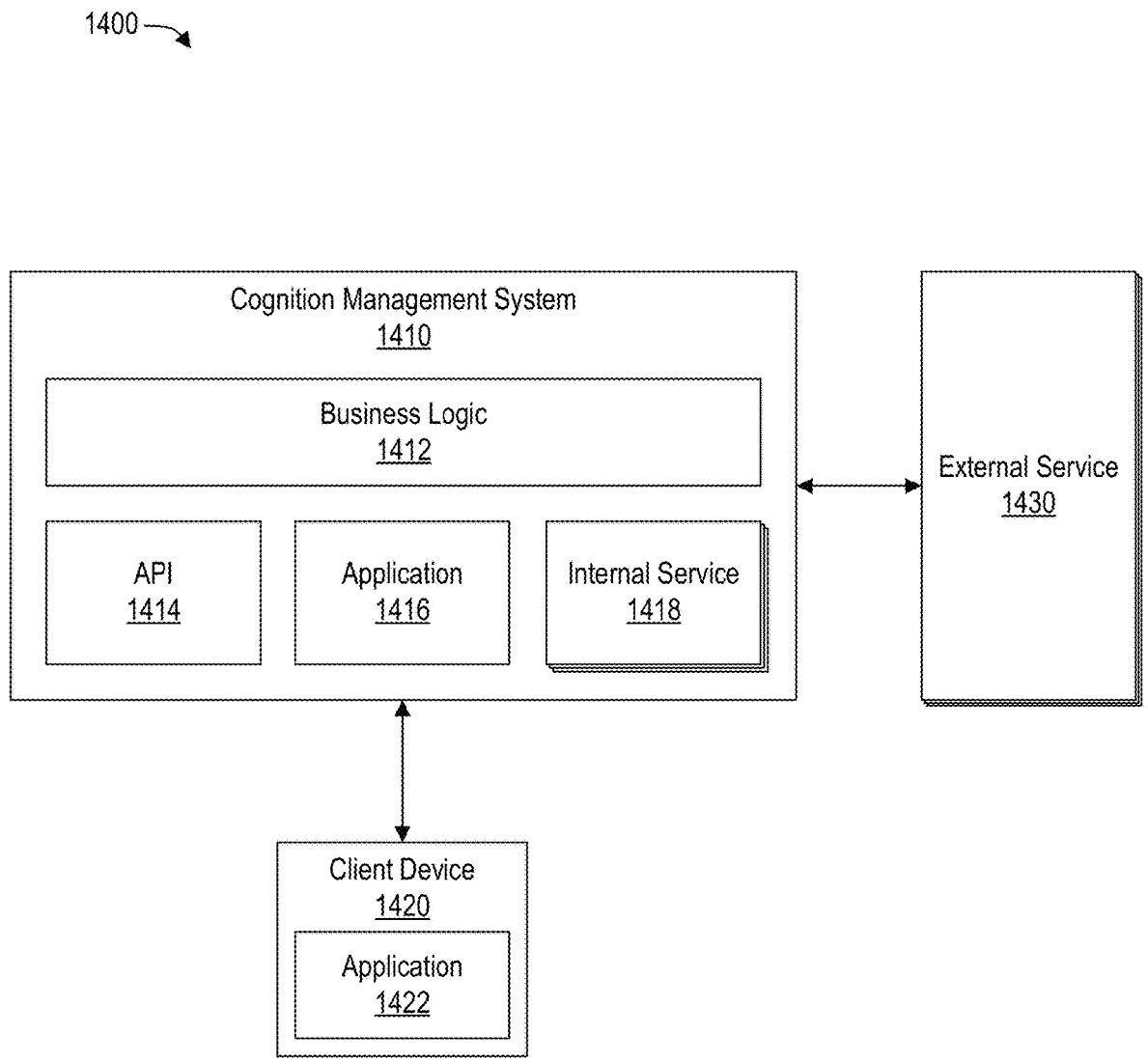
FIG. 14 is a conceptual diagram illustrating an architecture and deployment of a cognition management system in accordance with some aspects of the disclosure.

FIG. 14 is a conceptual diagram 1400 illustrating an architecture and deployment of a cognition management system 1410 in accordance with some aspects of the disclosure. The cognition management system 1410 is configured to provide application functionality to a client device 1420 using various techniques and may employ one or more external services 1430. In accordance with some aspects, the cognition management system 1410 includes a business logic 1414 to perform various domain-specific functions of the cognition management system 1410. For example, the cognition management system 1410 may collect information from the external services 1430, analyze unstructured data, and so forth. The cognition management system 1410 may also include an API 1414, an application 1416, and one or more internal services 1418.

The API 1414 may be employed in some scenarios such as when a client device 1420 is executing an application 1422 natively (e.g., without the use of an interpreter). In some cases, the application 416 may be sent to the client device and the client device 1420 executes the application 1416 in a sandbox. Examples of sandboxed applications include various web applications that use client-side rendering techniques such as React, Angular, SolidJS, Blazor, and so forth. Sandboxed applications may use the API 1414 to send requests to the cognition management system 1410, and the business logic 1414 generates a response, which is provided to the client device 1420. In other cases, the application 1422 can be dynamically rendered based on hybrid render techniques that separate some instructions of an application and cause some instructions to be executed at the server, and some instructions to be executed at the client.

In some cases, the application 1416 may be executed within the cognition management system 1410 to provide a view, which is the state of the current render, to the client device 1420. In some cases, the API 1414, the application 1416, or the application 1416 may engage with the internal services 1418 for various purposes. The internal services 1418 can be, for example, various containerized microservices or another type of distributed architecture.

The external services 1430 are used for various purposes, such as to collect data from various sources. As described above, the sources can be related to research papers, standards proposals, and so forth. In other cases, the external services can be storage services (e.g., object storage, block storage, etc.), monitoring services, authentication services, etc.

Figure 15:
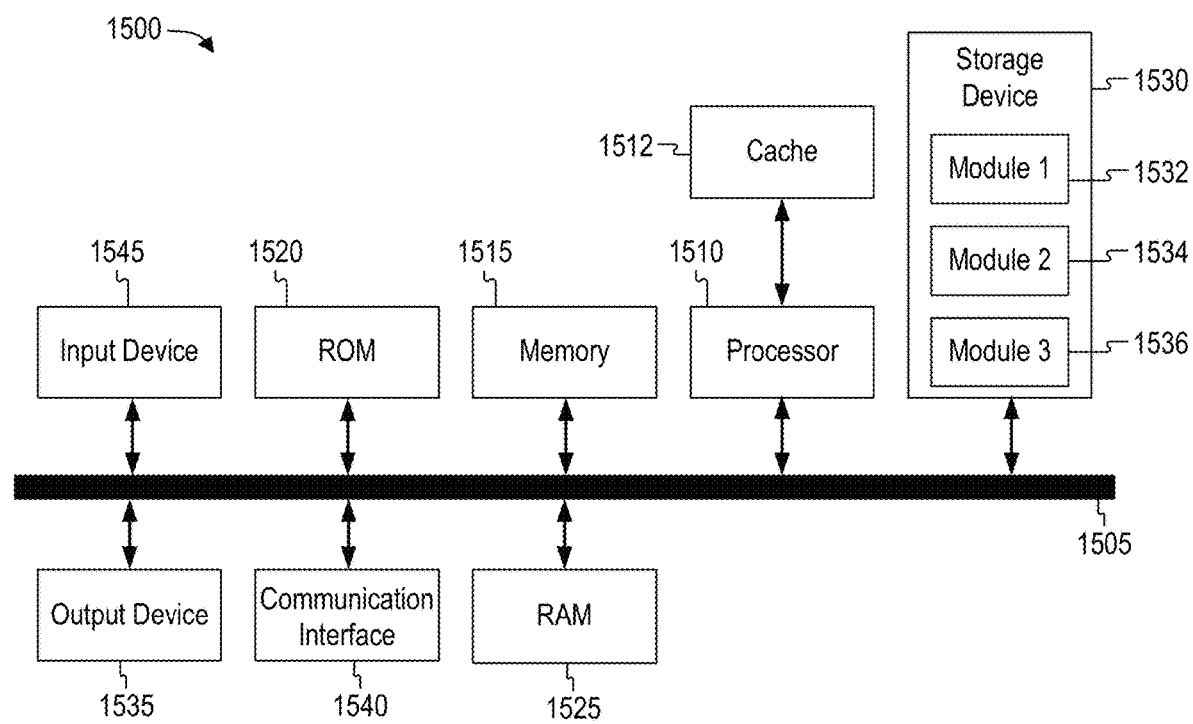
FIG. 15 is a diagram illustrating an example of a system for implementing certain aspects of the present technology.

FIG. 15 is a diagram illustrating an example of a system for implementing certain aspects of the present technology. In particular, FIG. 15 illustrates an example of computing system 1500, which can be for example any computing device making up an internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some aspects, computing system 1500 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example computing system 1500 includes at least one processing unit (CPU or processor) 1510 and connection 1505 that couples various system components including system memory 1515, such as ROM 1520 and RAM 1525 to processor 1510. Computing system 1500 can include a cache 1512 of high-speed memory connected directly with, in close proximity to, or integrated as part of processor 1510.

Processor 1510 can include any general purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a BLE wireless signal transfer, an IBEACON® wireless signal transfer, an RFID wireless signal transfer, near-field communications (NFC) wireless signal transfer, dedicated short range communication (DSRC) wireless signal transfer, 802.11 WiFi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based GPS, the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some aspects, a hardware service that performs a particular function can include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the Wi-Fi (802.11x) standards, data according to the Bluetooth™ standard, data according to the IP standard, and/or other types of data.

The components of the computing device can be implemented in circuitry. For example, the components can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices, or other small form factor personal computers, personal digital assistants, rackmount devices, standalone devices, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative aspects of the disclosure include:

We will generate the aspects after claims are approved.

Aspect 1. A method comprising: identifying nodes from content from different data sources, wherein the content includes grant information, a technical publication, or a legal publication and each node corresponds to an entity associated with technical data; associating at least one content item from the different data sources to a corresponding node; normalizing vectors identifying features of each content item based on linguistic differences associated with the different data sources; generating embeddings associated with each content item based on normalized vectors associated with each content item; and identifying a first node based on content items associated with the first node.

Aspect 2. The method of Aspect 1, further comprising: normalizing the vectors identifying features of each content item into the normalized vectors based on the linguistic differences of the different data sources.

Aspect 3. The method of any of Aspects 1 to 2, further comprising: clustering the content items into a plurality of groups based on the embeddings; and, after clustering the content items, generating a label that corresponds to each group.

Aspect 4. The method of any of Aspects 1 to 3, further comprising: identifying an equivalent portion of the content from the different data sources, wherein the vectors are identified from the equivalent portion of the content.

Aspect 5. The method of Aspect 4, further comprising: transforming the equivalent portion of the content from the different data sources into normalized content.

Aspect 6. The method of Aspect 5, wherein transforming the equivalent portion of the content comprises: converting words from into a common linguistic form based on a data source of the content.

Aspect 7. The method of any of Aspects 5 to 6, wherein transforming the equivalent portion of the content comprises: identifying and removing words from the content based on a list of words or word stems, wherein the list of words or word stems include terminology associated with a technical field.

Aspect 8. The method of any of Aspects 5 to 7, wherein transforming the equivalent portion of the content comprises: generating supplemental content based on terminology within the content, and inserting the supplemental content at a beginning or end of the content.

Aspect 9. The method of any of Aspects 5 to 8, wherein transforming the equivalent portion of the content comprises: identifying words within the content associated with the content having a high correlation to a technical field; and adding the words at different portions of the content.

Aspect 10. The method of any of Aspects 5 to 9, wherein transforming the equivalent portion of the content comprises: generating a prompt for a large language model to transform the content into a normalized form; and obtaining the normalized content based on the prompt and the content being provided to the large language model.

Aspect 11. The method of Aspect 10, wherein the prompt includes hints relating to at least one embedding or classification.

Aspect 12. The method of any of Aspects 5 to 11, further comprising generating embeddings associated with the content from the normalized content.

Aspect 13. The method of any of Aspects 1 to 12, further comprising: training a machine learning model to generate multi-dimensional representations of the entity or technical fields corresponding to the entity.

Aspect 14. A method of surfacing research and development metadata, comprising: receiving a plurality of inputs pertaining to technical fields or entities associated with one or more technical fields, wherein the plurality of inputs include inputs pertaining to a change of at least one variable; obtaining, using a machine learning model, a multi-dimensional representation of the technical fields or entities based on the plurality of inputs, wherein the multi-dimensional representation includes content items at different locations and different dimensions, and the content items are associated with at least one entity; determining a representation of the multi-dimensional representation that can be presented in two or three dimensions; and displaying the representation illustrating change of the technical fields or entities based on a selected dimension in the plurality of inputs.

Aspect 15. The method of Aspect 14, wherein the multi-dimensional representation include more than three dimensions.

Aspect 16. The method of any of Aspects 14 to 15, wherein the machine learning model determines a topic vector associated with the plurality of inputs based on corresponding metaknowledge artifacts associated with the plurality of inputs.

Aspect 17. The method of Aspect 16, wherein determining the representation of the multi-dimensional representation comprises: identifying a group of people associated with the topic vector; determining a centroid of each person in the group of people based on centroids of the group of people at different points of the dimension; determining positions of each person with respect to the centroids of the group of people and the different points of the at least one variable; and generating a scatter plot based on the positions of each person with respect to the centroid and the group of people and the different points of the at least one variable.

Aspect 18. The method of Aspect 17, wherein the dimension comprises a duration of time, and the scatter plot illustrates changes in the technical fields or entities over the duration of time.

Aspect 19. The method of any of Aspects 17 to 18, further comprising: encoding at least one property of each person in the scatter plot using a color or a size of a point representing a corresponding person, wherein the at least property includes at least one of a technical classification, grant information, publication information, patent information, or entity information expressly associated with the corresponding person.

Aspect 20. A method comprising: analyzing data with a machine learning model to create embeddings associated with the data; grouping the data into a plurality of clusters based on the embeddings; identifying at least one property of a first cluster associated with a first period of time; receiving a query related to the first cluster associated with the plurality of clusters; and generating a response to the query based on properties associated with the first cluster over the first period of time.

Aspect 21. The method of Aspect 20, further comprising: identifying a date associated with each document from the document or from external information related to the document.

Aspect 22. The method of any of Aspects 20 to 21, wherein identifying the properties associated with the first cluster over time comprises: generating a first point cloud for unstructured data associated with the first cluster within the first period of time.

Aspect 23. The method of Aspect 22, wherein the at least one property includes at least one of a position of the first cluster, a velocity of the first cluster, a volume of the first cluster, a rate of volume change the first cluster; a rate of positional change of the first cluster relative to at least another cluster; a temperature of the first cluster associated with a parameter over time, a density of the first cluster based on a quantitative unit over time, a rate of temperature change of the first cluster, or a shape of the first cluster, or a rate of shape change of the first cluster.

Aspect 24. The method of any of Aspects 22 to 23, further comprising: generating a second point cloud for data associated with the first cluster within a second period of time; and determining the at least one property based on a difference of the first point cloud and the second point cloud.

Aspect 25. The method of any of Aspects 22 to 24, further comprising: determining a registration based on the first point cloud and a second point cloud; and applying the registration to the first point cloud and the second point cloud, wherein the at least one property is determined based on a difference of the first point cloud and the second point cloud after registration.

Aspect 26. The method of any of Aspects 22 to 25, further comprising: generating a second point cloud for data associated with a second cluster within the first period of time or a second period of time, wherein the second point cloud is mapped to a common dimension coordinate system; and determining the at least one property based on a difference of the first point cloud and the second point cloud within the common dimension coordinate system.

Aspect 27. The method of any of Aspects 20 to 26, wherein identifying the unique properties associated with the first cluster in the plurality of clusters comprises: determining a priority of each synthesized embedding of the first cluster based on a classification system and unstructured data associated with the first cluster; and selecting at least one synthesized embedding as an identifier to identify the first cluster based on the priority.

Aspect 28. The method of any of Aspects 20 to 27, wherein identifying the unique properties associated with the first cluster in the plurality of clusters comprises: providing the synthesized embeddings to a large language model; and receiving an identifier of the first cluster from the large language model.

Aspect 29. The method of any of Aspects 20 to 28, further comprising: reducing dimensions associated with the synthesized embeddings.

Aspect 30. The method of any of Aspects 20 to 29, wherein the response comprises at least one of a graph of at least the first cluster, a projection illustration for the first period of time associated with at least the first cluster, a video depicting at least the first cluster mapped to a coordinate system and changes to the first cluster with respect to time, statistics associated with the first cluster, a heat map including at least the first cluster, a list identifying a plurality of people or entities corresponding to the query.

Aspect 31. The method of any of Aspects 20 to 30, wherein the data comprises at least one of scientific journal articles, clinical data, financial data, regulatory data, patent applications, granted patents, standards committee papers, whitepapers, datasheets, investor report data, marketing data, and researcher data.

Aspect 32. The method of any of Aspects 20 to 31, wherein the machine learning model includes a transformer to create the embeddings associated with the data based on attention.

Aspect 33. The method of any of Aspects 20 to 32, wherein the query identifies at least one cluster and at least one parameter to evaluate the at least one cluster.

Aspect 34. The method of any of Aspects 20 to 33, wherein the at least one entity comprises at least one of a researcher, a group of researchers, a research entity, a business entity, a collaboration entity, a university, and a government entity.

Aspect 35. A computing device for surfacing research and development metadata. The computing device includes at least one memory and at least one processor coupled to the at least one memory and configured to: identify nodes from content from different data sources, wherein the content includes grant information, a technical publication, or a legal publication and each node corresponds to an entity associated with technical data; associate at least one content item from the different data sources to a corresponding node; normalize vectors identifying features of each content item based on linguistic differences associated with the different data sources; generate embeddings associated with each content item based on normalized vectors associated with each content item; and identify a first node based on content items associated with the first node.

Aspect 36. The computing device of Aspect 35, wherein the at least one processor is configured to: normalize the vectors identifying features of each content item into the normalized vectors based on the linguistic differences of the different data sources.

Aspect 37. The computing device of any of Aspects 35 to 36, wherein the at least one processor is configured to: cluster the content items into a plurality of groups based on the embeddings; and, after clustering the content items, generate a label that corresponds to each group.

Aspect 38. The computing device of any of Aspects 35 to 37, wherein the at least one processor is configured to: identifying an equivalent portion of the content from the different data sources, wherein the vectors are identified from the equivalent portion of the content.

Aspect 39. The computing device of Aspect 38, wherein the at least one processor is configured to: transform the equivalent portion of the content from the different data sources into normalized content.

Aspect 40. The computing device of Aspect 39, wherein the at least one processor is configured to: convert words from into a common linguistic form based on a data source of the content.

Aspect 41. The computing device of any of Aspects 39 to 40, wherein the at least one processor is configured to: identify and remove words from the content based on a list of words or word stems, wherein the list of words or word stems include terminology associated with a technical field.

Aspect 42. The computing device of any of Aspects 39 to 41, wherein the at least one processor is configured to: generate supplemental content based on terminology within the content, and insert the supplemental content at a beginning or end of the content.

Aspect 43. The computing device of any of Aspects 39 to 42, wherein the at least one processor is configured to: identify words within the content associated with the content having a high correlation to a technical field; and add the words at different portions of the content.

Aspect 44. The computing device of any of Aspects 39 to 43, wherein the at least one processor is configured to: generate a prompt for a large language model to transform the content into a normalized form; and obtain the normalized content based on the prompt and the content being provided to the large language model.

Aspect 45. The computing device of Aspect 44, wherein the prompt includes hints relating to at least one embedding or classification.

Aspect 46. The computing device of any of Aspects 39 to 45, wherein the at least one processor is configured to: generate embeddings associated with the content from the normalized content.

Aspect 47. The computing device of any of Aspects 35 to 46, wherein the at least one processor is configured to: train a machine learning model to generate multi-dimensional representations of the entity or technical fields corresponding to the entity.

Aspect 48. A computing device for surfacing research and development metadata. The computing device includes at least one memory and at least one processor coupled to the at least one memory and configured to: receive a plurality of inputs pertaining to technical fields or entities associated with one or more technical fields, wherein the plurality of inputs include inputs pertaining to a change of at least one variable; obtain, using a machine learning model, a multi-dimensional representation of the technical fields or entities based on the plurality of inputs, wherein the multi-dimensional representation includes content items at different locations and different dimensions, and the content items are associated with at least one entity; determine a representation of the multi-dimensional representation that can be presented in two or three dimensions; and display the representation illustrating change of the technical fields or entities based on a selected dimension in the plurality of inputs.

Aspect 49. The computing device of Aspect 48, wherein the multi-dimensional representation includes more than three dimensions.

Aspect 50. The computing device of any of Aspects 48 to 49, wherein the machine learning model determines a topic vector associated with the plurality of inputs based on corresponding metaknowledge artifacts associated with the plurality of inputs.

Aspect 51. The computing device of Aspect 50, wherein the at least one processor is configured to: identify a group of people associated with the topic vector; determine a centroid of each person in the group of people based on centroids of the group of people at different points of the dimension; determine positions of each person with respect to the centroids of the group of people and the different points of the at least one variable; and generate a scatter plot based on the positions of each person with respect to the centroid and the group of people and the different points of the at least one variable.

Aspect 52. The computing device of Aspect 51, wherein the dimension comprises a duration of time, and the scatter plot illustrates changes in the technical fields or entities over the duration of time.

Aspect 53. The computing device of any of Aspects 51 to 52, wherein the at least one processor is configured to: encode at least one property of each person in the scatter plot using a color or a size of a point representing a corresponding person, wherein the at least property includes at least one of a technical classification, grant information, publication information, patent information, or entity information expressly associated with the corresponding person.

Aspect 54. A computing device for surfacing research and development metadata. The computing device includes at least one memory and at least one processor coupled to the at least one memory and configured to: analyze data with a machine learning model to create embeddings associated with the data; group the data into a plurality of clusters based on the embeddings; identify at least one property of a first cluster associated with a first period of time; receive a query related to the first cluster associated with the plurality of clusters; and generate a response to the query based on properties associated with the first cluster over the first period of time.

Aspect 55. The computing device of Aspect 54, wherein the at least one processor is configured to: identify a date associated with each document from the document or from external information related to the document.

Aspect 56. The computing device of any of Aspects 54 to 55, wherein the at least one processor is configured to: generate a first point cloud for unstructured data associated with the first cluster within the first period of time.

Aspect 57. The computing device of Aspect 56, wherein the at least one processor is configured to: wherein the at least one property includes at least one of a position of the first cluster, a velocity of the first cluster, a volume of the first cluster, a rate of volume change the first cluster; a rate of positional change of the first cluster relative to at least another cluster; a temperature of the first cluster associated with a parameter over time, a density of the first cluster based on a quantitative unit over time, a rate of temperature change of the first cluster, or a shape of the first cluster, or a rate of shape change of the first cluster.

Aspect 58. The computing device of any of Aspects 56 to 57, wherein the at least one processor is configured to: generate a second point cloud for data associated with the first cluster within a second period of time; and determine the at least one property based on a difference of the first point cloud and the second point cloud.

Aspect 59. The computing device of any of Aspects 56 to 58, wherein the at least one processor is configured to: determine a registration based on the first point cloud and a second point cloud; apply the registration to the first point cloud and the second point cloud, wherein the at least one property is determined based on a difference of the first point cloud and the second point cloud after registration.

Aspect 60. The computing device of any of Aspects 56 to 59, wherein the at least one processor is configured to: generate a second point cloud for data associated with a second cluster within the first period of time or a second period of time, wherein the second point cloud is mapped to a common dimension coordinate system; determine the at least one property based on a difference of the first point cloud and the second point cloud within the common dimension coordinate system.

Aspect 61. The computing device of any of Aspects 54 to 60, wherein to identify the unique properties associated with the first cluster in the plurality of cluster, the at least one processor is configured to: determine a priority of each synthesized embedding of the first cluster based on a classification system and unstructured data associated with the first cluster; and select at least one synthesized embedding as an identifier to identify the first cluster based on the priority.

Aspect 62. The computing device of any of Aspects 54 to 61, wherein the at least one processor is configured to: provide the synthesized embeddings to a large language model; and receive an identifier of the first cluster from the large language model.

Aspect 63. The computing device of any of Aspects 54 to 62, wherein the at least one processor is configured to: reduce dimensions associated with the synthesized embeddings.

Aspect 64. The computing device of any of Aspects 54 to 63, the response comprises at least one of a graph of at least the first cluster, a projection illustration for the first period of time associated with at least the first cluster, a video depicting at least the first cluster mapped to a coordinate system and changes to the first cluster with respect to time, statistics associated with the first cluster, a heat map including at least the first cluster, a list identifying a plurality of people or entities corresponding to the query.

Aspect 65. The computing device of any of Aspects 54 to 64, wherein the data comprises at least one of scientific journal articles, clinical data, financial data, regulatory data, patent applications, granted patents, standards committee papers, whitepapers, datasheets, investor report data, marketing data, and researcher data.

Aspect 66. The computing device of any of Aspects 54 to 65, wherein the machine learning model includes a transformer to create the embeddings associated with the data based on attention.

Aspect 67. The computing device of any of Aspects 54 to 66, wherein the query identifies at least one cluster and at least one parameter to evaluate the at least one cluster.

Aspect 68. The computing device of any of Aspects 54 to 67, wherein the at least one entity comprises at least one of a researcher, a group of researchers, a research entity, a business entity, a collaboration entity, a university, and a government entity.

What is claimed is:

1. A computer implemented method comprising:
identifying nodes from content from different data sources, wherein the content includes grant information, a technical publication, or a legal publication and each node corresponds to one of a person or an organization associated with technical data;
associating at least one content item from the different data sources to a corresponding node;
normalizing vectors identifying features of each content item based on word differences of common features associated with the different data sources;
generating embeddings associated with each content item based on normalized vectors associated with each content item;
in response to a user input query to map at least one property or classification pertaining to scientific research associated with a first node between a first time and a second time, wherein the user input query identifies the node associated with a cluster associated with the scientific research, the at least one property or classification of the scientific research, the first time, and the second time;
determining a displacement of the first node along an axis representing the at least one property or classification of the at least one property or classification pertaining to the scientific research between the first time and the second time relative to other nodes of the cluster based on the user input query and the embeddings associated with the at least one property or classification;
determining a centroid displacement of the cluster associated with the first node and the other nodes between the first time and the second time based on the user input query; and
displaying a visualization of temporal evolution of the at least one property or classification pertaining to the scientific research relative to the centroid displacement, wherein the visualization includes the displacement of the first node with the other nodes along the axis illustrating a change in the first node and the other nodes between the first time and the second time with respect to the at least one property or classification pertaining to the scientific research.

2. The method of claim 1, further comprising:
normalizing the vectors identifying features of each content item into the normalized vectors based on linguistic differences of the different data sources.

3. The method of claim 1, further comprising:
clustering the content items into a plurality of groups based on the embeddings; and,
after clustering the content items, generating a label that corresponds to each group.

4. The method of claim 1, further comprising:
identifying an equivalent portion of the content from the different data sources, wherein the vectors are identified from the equivalent portion of the content.

5. The method of claim 4, further comprising:
transforming the equivalent portion of the content from the different data sources into normalized content.

6. The method of claim 5, wherein transforming the equivalent portion of the content comprises:
converting words into a representative list including words or word stems based on a data source of the content.

7. The method of claim 5, wherein transforming the equivalent portion of the content comprises:
identifying and removing words from the content based on a list of words or word stems associated with a technical field.

8. The method of claim 5, wherein transforming the equivalent portion of the content comprises:
generating supplemental content based on terminology within the content, and inserting the supplemental content at a beginning or end of the content.

9. The method of claim 5, wherein transforming the equivalent portion of the content comprises:
identifying words within the content associated with the content having a high correlation to a technical field; and
adding the words at different portions of the content.

10. The method of claim 5, wherein transforming the equivalent portion of the content comprises:
generating a prompt for a large language model to transform the content into a normalized form; and
obtaining the normalized content based on the prompt and the content being provided to the large language model.

11. The method of claim 10, wherein the prompt includes hints relating to at least one embedding or classification.

12. The method of claim 5, further comprising generating embeddings associated with the content from the normalized content.

13. The method of claim 1, further comprising:
training a machine learning model to generate multidimensional representations of the person or the organization and technical fields corresponding to the person or the organization.

14. A computer implemented method comprising:
analyzing data with a machine learning model to create embeddings associated with the data, wherein the data comprises content items from different data sources including grant information, technical publications, or regulatory publications, wherein each content item within the data is associated with at least one entity, wherein the data includes vectors that are normalized from the different data sources based on semantic differences associated with the different data sources, and wherein the semantic differences include differences in disciplinary and modal semantic norms associated with the different data sources;
grouping the data into a plurality of clusters based on the embeddings;
receiving a user input query related to a first cluster associated with the plurality of clusters to map at least one property or classification pertaining to scientific research associated with the first cluster between a first time and a second time, wherein the user input query identifies the first cluster, the at least one property or classification of the scientific research, the first time, and the second time;
determining displacements of the first cluster and other clusters of the plurality of clusters along a first axis representing the at least one property or classification pertaining to the scientific research between the first time and the second time based on the user input query and the embeddings associated with the at least one property or classification;
determining an area deformation of the first cluster between the first time and the second representing a second property or classification; and
displaying a visualization of temporal evolution based on the displacements of the first cluster and the other clusters between the first time and the second time and the area deformation of the first cluster.

15. The method of claim 1, further comprising:
identifying the other nodes associated with the user input query based on the at least one property or classification, each node corresponding to a person and the at least one property or classification corresponding to at least one dimension; and
determining a position of each person with respect to the centroids of the group of people and the different points of the at least one dimension.

16. The method of claim 15, wherein displaying the displacement of the first node with other nodes comprises displaying a visual representation of each person in the at least one dimension.

17. The method of claim 15, wherein further comprising displaying a scatter plot dividing the first node and the other nodes into classifications associated with the scientific research.

* * * * *